(12) United States Patent
Teranishi

(10) Patent No.: US 7,693,021 B2
(45) Date of Patent: Apr. 6, 2010

(54) OPTICAL INFORMATION RECORDING APPARATUS AND METHOD

(75) Inventor: Yasuhiko Teranishi, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1001 days.

(21) Appl. No.: 11/401,243

(22) Filed: Apr. 11, 2006

(65) Prior Publication Data

US 2006/0233079 A1    Oct. 19, 2006

(30) Foreign Application Priority Data

Apr. 18, 2005   (JP)   ............... 2005-119191
Jan. 31, 2006   (JP)   ............... 2006-021800

(51) Int. Cl.
*G11B 7/00* (2006.01)
(52) U.S. Cl. ...................... 369/53.24; 369/94
(58) Field of Classification Search ........................ None
See application file for complete search history.

(56) References Cited

U.S. PATENT DOCUMENTS 7,423,955 B2 *   9/2008   Tieke et al. .............. 369/275.3
7,508,740 B2 *   3/2009   Sasaki ....................... 369/47.1
7,548,499 B2 *   6/2009   Tagiri et al. ............... 369/53.14
2006/0083141 A1 *   4/2006   Teranishi et al. ......... 369/53.24

FOREIGN PATENT DOCUMENTS

JP    10-293926    11/1998

\* cited by examiner

*Primary Examiner*—Joseph H Feild
*Assistant Examiner*—Joseph Haley
(74) *Attorney, Agent, or Firm*—Louis Woo

(57) ABSTRACT

A first data-recorded region is formed in one of multiple recording layers of a rewritable optical disc before a second data-recorded region is formed therein. A first on-disc position is related to an innermost position within the second data-recorded region. Information is reproduced from a recording management area of the disc. A second on-disc position is derived from the reproduced information. The second on-disc position is in substantial coincidence with an outermost position within the first data-recorded region. The first on-disc position and the second on-disc position are compared to decide whether an unused portion is present in or absent from a region therebetween. When the unused portion is present, padding data is recorded thereon. The second on-disc position is updated into substantial coincidence with an outermost position within the second data-recorded region. The information in the recording management area is updated to reflect the updated second on-disc position.

12 Claims, 15 Drawing Sheets

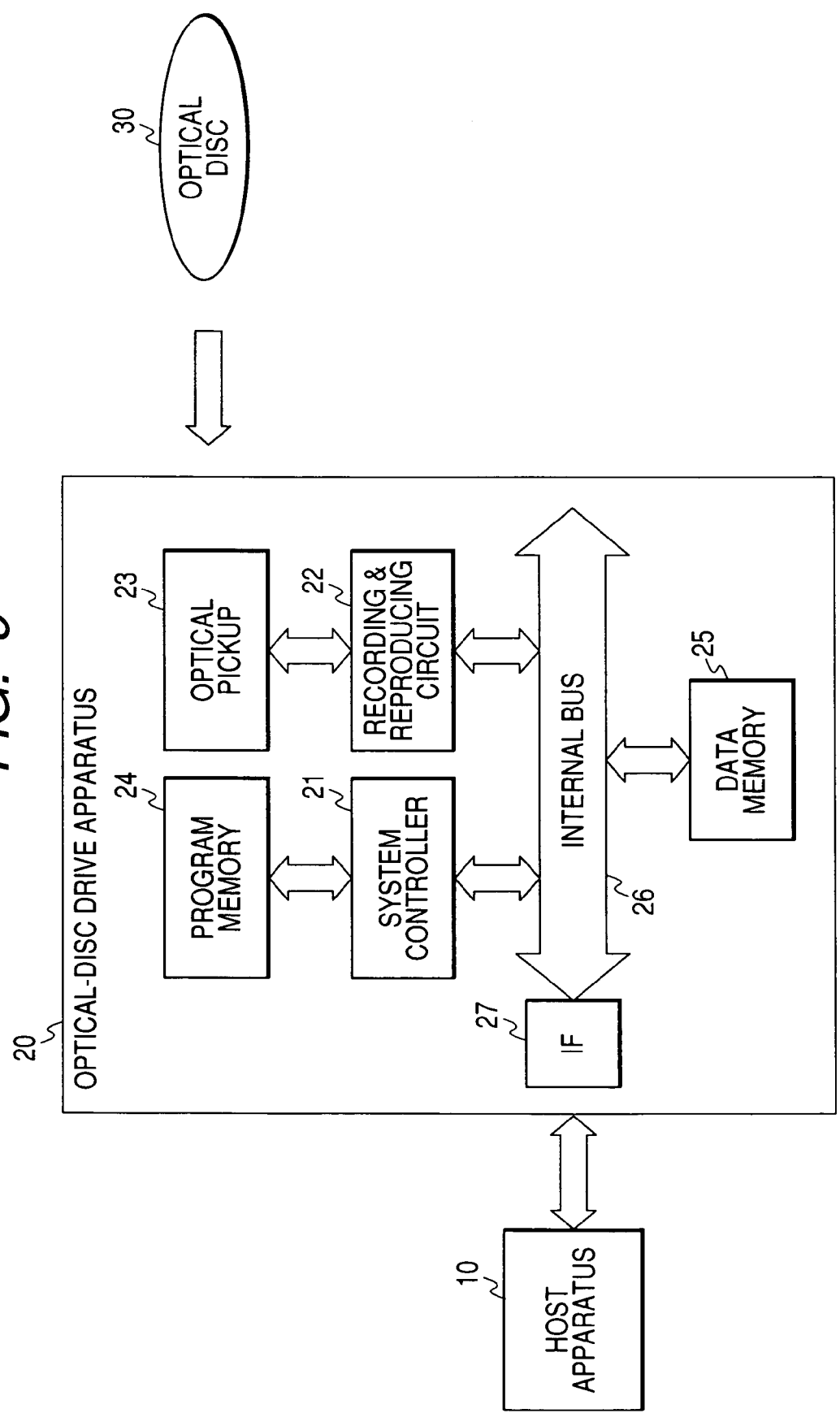

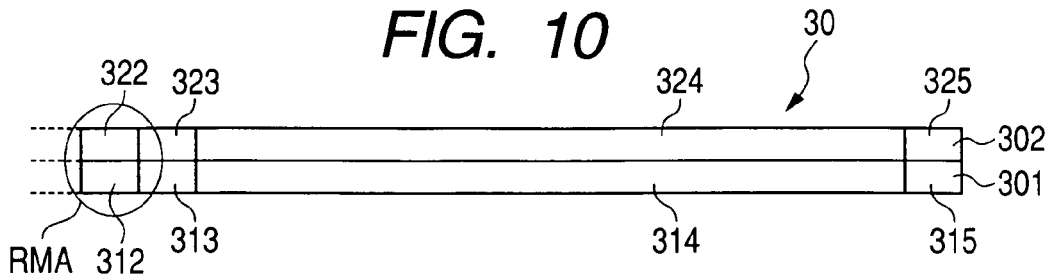
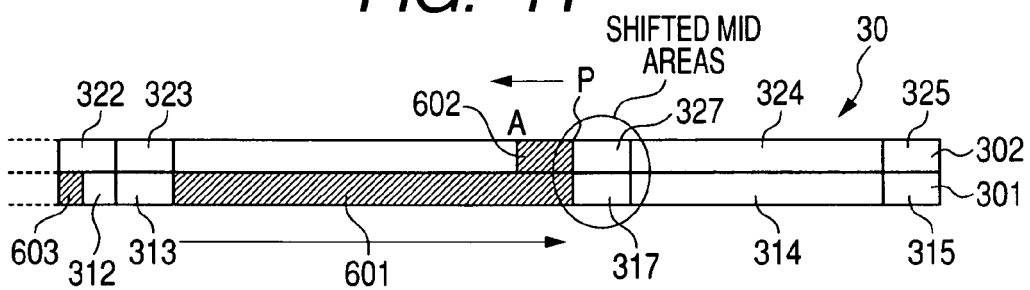
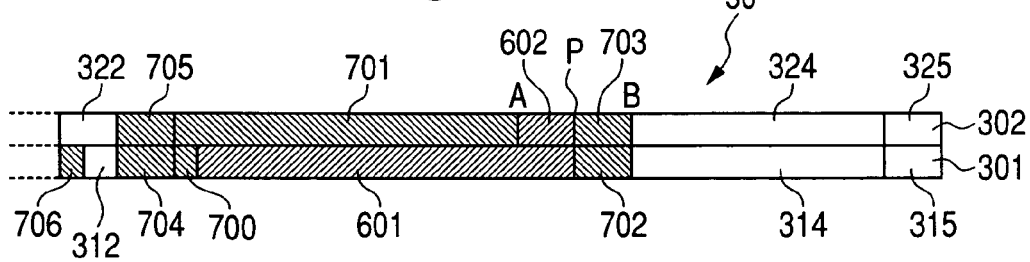
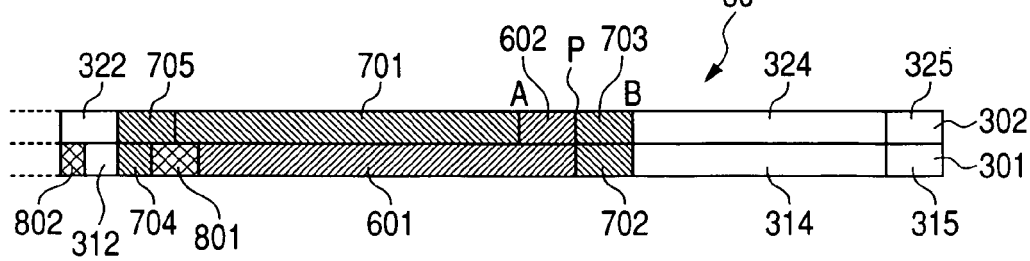
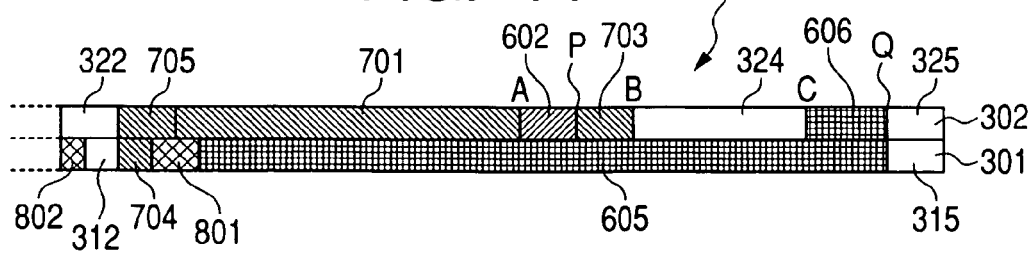

FIG. 19

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | 0 | 4 |
| ... | ... | ... |

FIG. 20

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | ADDRESS B | 4 |
| ... | ... | ... |

FIG. 21

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | ADDRESS N | 4 |
| ... | ... | ... |

FIG. 31

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | 0 | 4 |
| ... | ... | ... |

FIG. 32

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | ADDRESS B | 4 |
| ... | ... | ... |

FIG. 33

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | ADDRESS D | 4 |
| ... | ... | ... |

FIG. 34

| BP | CONTENTS | BYTE NUMBER |
|---|---|---|
| 0 to 3 | UPDATE CONTENTS | 4 |
| 4 to 7 | Format3 RMD POINTER | 4 |
| 8 to 11 | ADDRESS G | 4 |
| ... | ... | ... |

OPTICAL INFORMATION RECORDING APPARATUS AND METHOD

BACKGROUND OF THE INVENTION

1. Field of the Invention

This invention generally relates to an apparatus, a method, and a computer program for recording information on an optical recording medium such as an optical disc. This invention particularly relates to an apparatus, a method, and a computer program for recording information on a rewritable optical disc having a plurality of recording layers. In addition, this invention relates to an optical recording medium such as a rewritable optical disc having a plurality of recording layers.

2. Description of the Related Art

There are DVDs (digital versatile discs) of various types such as a DVD-R (DVD-recordable), a DVD-RW (DVD-rewritable), and a DVD-RAM. Some DVDs each have a single recording layer while other DVDs each have multiple recording layers. A DVD having a single recording layer is called a single-layer DVD. A DVD having a multiple recording layers is called a multi-layer DVD.

A DVD recorder subjects a DVD-R or a DVD-RW to a finalizing process after recording user data thereon. The finalizing process enables a DVD player to reproduce the user data from the DVD-R or the DVD-RW. In the case of a multi-layer DVD-R or DVD-RW, the finalizing process tends to take a relatively long time.

Multi-border writing is a method of recording a signal on a DVD-R or DVD-RW. The multi-border writing includes a step of closing bordered areas in the DVD-R or DVD-RW. In the case of a multi-layer DVD-R or DVD-RW, the bordered-area closing step tends to take a relatively long time.

SUMMARY OF THE INVENTION

It is a first object of this invention to provide an apparatus for recording information on an optical recording medium which can shorten a time taken by a finalizing process or a bordered-area closing step.

It is a second object of this invention to provide a method of recording information on an optical recording medium which can shorten a time taken by a finalizing process or a bordered-area closing step.

It is a third object of this invention to provide a computer program for recording information on an optical recording medium which can shorten a time taken by a finalizing process or a bordered-area closing step.

It is a fourth object of this invention to provide an improved optical recording medium.

A first aspect of this invention provides a method of recording information on a rewritable optical disc having a laminate of recording layers including first and second recording layers each with a data area and a recording management area. The method comprises the steps of calculating a first on-disc position related to an innermost position within a first data-recorded region in the data area of the second recording layer, the first data-recorded region being generated by latest data recording on the disc; reproducing recording management information from one of the recording management areas of the first and second recording layers; deriving a second on-disc position from the reproduced recording management information, the second on-disc position is in substantial coincidence with an outer-most position within a second data-recorded region in the second recording layer, the second data-recorded region being generated by data recording on the disc which is previous to the latest data recording; comparing the first on-disc position and the second on-disc position to decide whether an unused portion is present in or absent from a region between the first on-disc position and the second on-disc position; recording padding data on the unused portion to implement one of (1) finalizing the disc and (2) closing a bordered area in the disc when it is decided that the unused portion is present in the region between the first on-disc position and the second on-disc position; updating the second on-disc position into substantial coincidence with an outermost position within the first data-recorded region; and updating the recording management information in one of the recording management areas of the first and second recording layers in accordance with the updating of the second on-disc position.

A second aspect of this invention is based on the first aspect thereof, and provides a method further comprising the steps of simply reformatting the disc; and holding a portion of the recording management information in one of the recording management areas of the first and second recording layers which relates to the second on-disc position during the simply reformatting of the disc.

A third aspect of this invention provides an apparatus for recording information on a rewritable optical disc having a laminate of recording layers including first and second recording layers each with a data area and a recording management area. The apparatus comprises first means for calculating a first on-disc position related to an innermost position within a first data-recorded region in the data area of the second recording layer, the first data-recorded region being generated by first latest data recording on the disc; second means for reproducing recording management information from one of the recording management areas of the first and second recording layers; third means for deriving a second on-disc position from the recording management information reproduced by the second means, the second on-disc position is in substantial coincidence with an outer-most position within a second data-recorded region in the second recording layer, the second data-recorded region being generated by second latest data recording on the disc; fourth means for comparing the first on-disc position calculated by the first means and the second on-disc position derived by the third means to decide whether an unused portion is present in or absent from a region between the first on-disc position and the second on-disc position; fifth means for recording padding data on the unused portion to implement one of (1) finalizing the disc and (2) closing a bordered area in the disc when the fourth means decides that the unused portion is present in the region between the first on-disc position and the second on-disc position; sixth means for updating the second on-disc position into substantial coincidence with an outermost position within the first data-recorded region; and seventh means for updating the recording management information in one of the recording management areas of the first and second recording layers in accordance with the updating of the second on-disc position by the sixth means.

A fourth aspect of this invention is based on the third aspect thereof, and provides an apparatus further comprising eighth means for simply reformatting the disc; and ninth means for holding a portion of the recording management information in one of the recording management areas of the first and second recording layers which relates to the second on-disc position during the simply reformatting of the disc by the eighth means.

A fifth aspect of this invention provides a computer program for recording information on a rewritable optical disc having a laminate of recording layers including first and second recording layers each with a data area and a recording management area. The computer program enables a computer system to execute the steps of calculating a first on-disc position related to an innermost position within a first data-recorded region in the data area of the second recording layer, the first data-recorded region being generated by first latest data recording on the disc; reproducing recording management information from one of the recording management areas of the first and second recording layers; deriving a second on-disc position from the reproduced recording management information, the second on-disc position is in substantial coincidence with an outer-most position within a second data-recorded region in the second recording layer, the second data-recorded region being generated by second latest data recording on the disc; comparing the first on-disc position and the second on-disc position to decide whether an unused portion is present in or absent from a region between the first on-disc position and the second on-disc position; recording padding data on the unused portion to implement one of (1) finalizing the disc and (2) closing a bordered area in the disc when it is decided that the unused portion is present in the region between the first on-disc position and the second on-disc position; updating the second on-disc position into substantial coincidence with an outermost position within the first data-recorded region; and updating the recording management information in one of the recording management areas of the first and second recording layers in accordance with the updating of the second on-disc position.

A sixth aspect of this invention is based on the fifth aspect thereof, and provides a computer program which enables the computer system to further execute the steps of simply reformatting the disc; and holding a portion of the recording management information in one of the recording management areas of the first and second recording layers which relates to the second on-disc position during the simply reformatting of the disc.

A seventh aspect of this invention provides a rewritable optical disc having a laminate of recording layers including first and second recording layers each with a data area and a recording management area, wherein one of the recording management areas of the first and second recording layers contains recording management information having a portion representing an on-disc position which is in substantial coincidence with an outer-most position within a data-recorded region in the second recording layer, and wherein the portion of the recording management information is held without being erased when the disc is subjected to simple reformatting.

An eighth aspect of this invention provides a method of recording information on a rewritable optical disc having a recording management area and a laminate of recording layers including first and second recording layers. The method comprises the steps of recording data on the first and second recording layers to form data-recorded regions including a first data-recorded region extending in the second recording layer, and thereafter recording data on the first and second recording layers to form data-recorded regions including a second data-recorded region extending in the second recording layer; deriving a first on-disc position related to an innermost position within the second data-recorded region; reproducing information from the recording management area; deriving a second on-disc position from the reproduced information, the second on-disc position is in substantial coincidence with an outermost position within the first data-recorded region; comparing the first on-disc position and the second on-disc position to decide whether an unused portion is present in or absent from a region between the first on-disc position and the second on-disc position; recording padding data on the unused portion when it is decided that the unused portion is present in the region between the first on-disc position and the second on-disc position; updating the second on-disc position into substantial coincidence with an outermost position within the second data-recorded region; and updating the information in the recording management area to reflect the updated second on-disc position.

A ninth aspect of this invention is based on the eighth aspect thereof, and provides a method further comprising the steps of simply reformatting the disc; and holding a portion of the information in the recording management area which relates to the second on-disc position during the simply reformatting of the disc.

A tenth aspect of this invention provides an apparatus for recording information on a rewritable optical disc having a recording management area and a laminate of recording layers including first and second recording layers. The apparatus comprises first means for recording data on the first and second recording layers to form data-recorded regions including a first data-recorded region extending in the second recording layer, and thereafter recording data on the first and second recording layers to form data-recorded regions including a second data-recorded region extending in the second recording layer; second means for deriving a first on-disc position related to an innermost position within the second data-recorded region; third means for reproducing information from the recording management area; fourth means for deriving a second on-disc position from the information reproduced by the third means, the second on-disc position is in substantial coincidence with an outermost position within the first data-recorded region; fifth means for comparing the first on-disc position derived by the second means and the second on-disc position derived by the fourth means to decide whether an unused portion is present in or absent from a region between the first on-disc position and the second on-disc position; sixth means for recording padding data on the unused portion when the fifth means decides that the unused portion is present in the region between the first on-disc position and the second on-disc position; seventh means for updating the second on-disc position into substantial coincidence with an outermost position within the second data-recorded region; and eighth means for updating the information in the recording management area to reflect the second on-disc position updated by the seventh means.

An eleventh aspect of this invention is based on the tenth aspect thereof, and provides an apparatus further comprising ninth means for simply reformatting the disc; and tenth means for holding a portion of the information in the recording management area which relates to the second on-disc position during the simply reformatting of the disc by the ninth means.

A twelfth aspect of this invention provides an optical information recording method comprising the steps of enabling an optical pickup to apply a light beam to each of recording layers of a rewritable optical information recording medium having a plurality of recording layers, arbitrarily setting a middle area or a border zone in a data area of the plurality of the recording layers, recording user data on a region between the middle area or the border zone and an innermost position of the data area or another border zone in an inner side, recording recording management information in a recording management area of each of the recording layers, thereafter implementing a border close process or a finalize process for allowing playback by an exclusive playback device, characterized by further comprising a first step of, in the case where with respect to a rewritable optical information recording medium loaded with user data of previous time and then subjected to the finalize process or the border close process, quick format is implemented and user data of this time is recorded and thereafter the finalize process or the border close process is implemented, calculating a first position information representing an innermost position of a user data recorded region of this time which is recorded immediately before a command for the finalize process or the border close process in a data area of another recording layer among the plurality of the recording layers except a recording layer closest to the optical pickup; a second step of obtaining second position information representing a position in substantial coincidence with an outermost position of a user data recorded region of up to previous time in the other recording layer which is contained in the recording management information reproduced from the recording management area; a third step of judging whether or not an unrecorded portion is present between the innermost position of the user data recorded region of this time and the position in substantial coincidence with the outermost position of the user data recorded region of up to previous time in the other recording layer on the basis of the first position information and the second position information; a fourth step of, when it is judged that the unrecorded portion is present in the other recording layer, recording padding data on the unrecorded portion and leaving a padding data recorded portion and a data recorded portion of up to previous time between the position in substantial coincidence with the outermost position of the user data recorded region of up to previous time and the innermost position of the data area in the other recording layer as they are; and a fifth step of recording position information representing the position in substantial coincidence with the outermost position of the user data recorded region of this time in the other recording layer on the recording management area as the second position information while making it contained in the recording management information.

A thirteenth aspect of this invention provides an optical information recording apparatus comprising means for enabling an optical pickup to apply a light beam to each of recording layers of a rewritable optical information recording medium having a plurality of recording layers, means for arbitrarily setting a middle area or a border zone in a data area of the plurality of the recording layers, means for recording user data on a region between the middle area or the border zone and an innermost position of the data area or another border zone in an inner side, means for recording recording management information in a recording management area of each of the recording layers, and means for thereafter implementing a border close process or a finalize process for allowing playback by an exclusive playback device, characterized by further comprising means for, in the case where with respect to a rewritable optical information recording medium loaded with user data of previous time and then subjected to the finalize process or the border close process, quick format is implemented and user data of this time is recorded and thereafter the finalize process or the border close process is implemented, calculating a first position information representing an innermost position of a user data recorded region of this time which is recorded immediately before a command for the finalize process or the border close process in a data area of another recording layer among the plurality of the recording layers except a recording layer closest to the optical pickup; means for obtaining second position information representing a position in substantial coincidence with an outermost position of a user data recorded region of up to previous time in the other recording layer which is contained in the recording management information reproduced from the recording management area; means for judging whether or not an unrecorded portion is present between the innermost position of the user data recorded region of this time and the position in substantial coincidence with the outermost position of the user data recorded region of up to previous time in the other recording layer on the basis of the first position information and the second position information; means for, when it is judged that the unrecorded portion is present in the other recording layer, recording padding data on the unrecorded portion and leaving a padding data recorded portion and a data recorded portion of up to previous time between the position in substantial coincidence with the outermost position of the user data recorded region of up to previous time and the innermost position of the data area in the other recording layer as they are; and means for recording position information representing the position in substantial coincidence with the outermost position of the user data recorded region of this time in the other recording layer on the recording management area as the second position information while making it contained in the recording management information.

This invention has the following advantages. It is possible to shorten a time taken by disc finalization. Furthermore, it is possible to shorten a time taken by a bordered-area closing process.

BRIEF DESCRIPTION OF THE DRAWINGS

FIG. 9 is a block diagram of an information recording and reproducing system including a host apparatus, an optical-disc drive apparatus, and an optical disc according to a first embodiment of this invention.

FIGS. 10-18 are sectional diagrams of the optical disc of FIG. 9 which is in states occurring at different stages respectively.

FIGS. 19-21 are diagrams of the contents of an RMD block which is in different states in the first embodiment of this invention.

FIGS. 31-34 are diagrams of the contents of an RMD block which is in different states in the second embodiment of this invention.

DETAILED DESCRIPTION OF THE INVENTION

Prior-art optical discs and prior-art apparatuses will be explained below for a better understanding of this invention.

Figure 1:
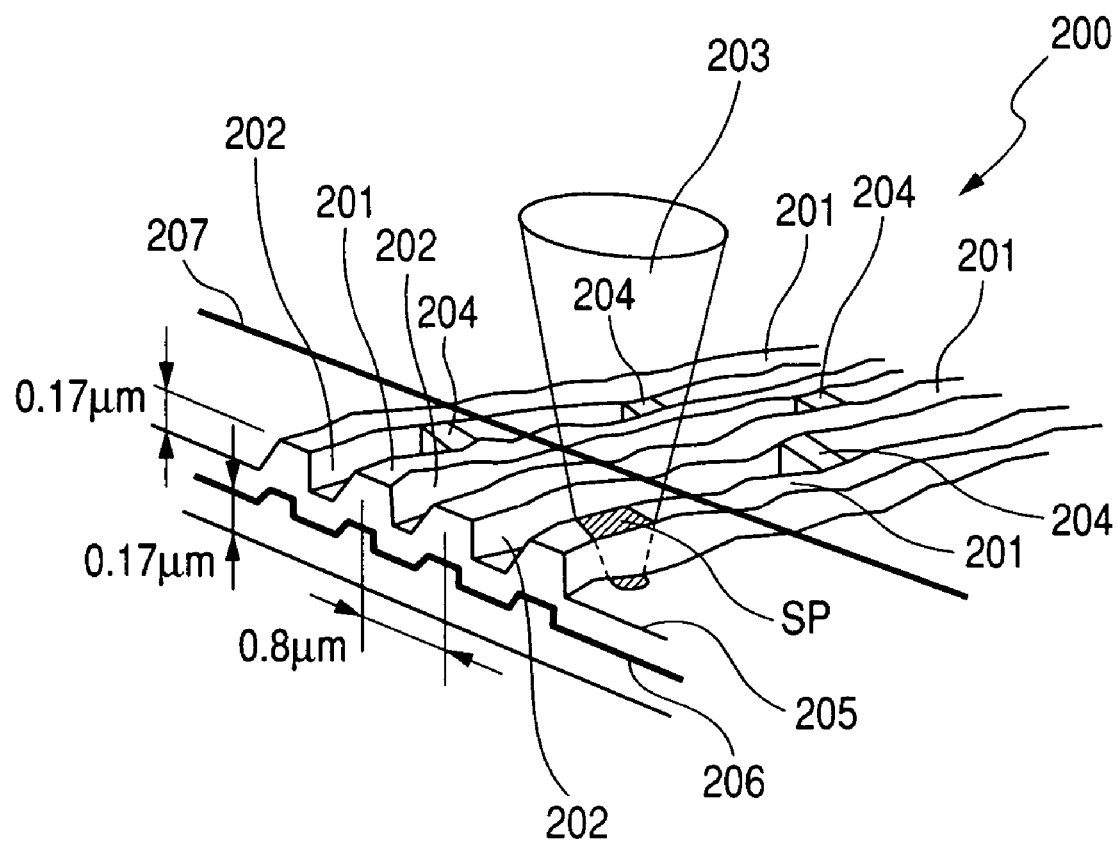
FIG. 1 is a perspective view of a first prior-art DVD-R.

FIG. 1 shows a prior-art DVD-R 200 disclosed in Japanese patent application publication number 10-293926/1998. It should be noted that a prior-art DVD-RW is similar in structure to the prior-art DVD-R 200 in FIG. 1.

As shown in FIG. 1, the prior-art disc 200 includes an information recording layer 205, a metal-deposited layer 206, and a protective layer 207. In FIG. 1, the metal-deposited layer 206 extends below the information recording layer 205. The protective layer 207 covers the information recording layer 205.

The information recording layer 205 has groove tracks 201 and land tracks 202 alternating with each other as viewed along a radial direction of the prior-art disc 200. The groove tracks 201 are main information recording tracks. Two land tracks 202 adjoining one groove track 201 are used for guiding a laser beam 203 to the groove track 201. Thus, the laser beam 203 is focused into a spot SP on the groove track 201.

On-disc address information and additional information are recorded on the prior-art disc 200 as land pre-pits (LPP) 204 in the land tracks 202 at the pre-formatting stage during the manufacture of the prior-art disc 200. The on-disc address information includes ECC-block address information. The land pre-pits (LPP) 204 are arranged in accordance with prescribed rules. A prior-art drive apparatus for the prior-art disc 200 reads out the ECC-block address information from the LPP 204. During the recording of a signal on the prior-art disc 200, the prior-art drive apparatus controls a currently accessed position on the prior-art disc 200 in response to the read-out ECC-block address information.

Figure 2:
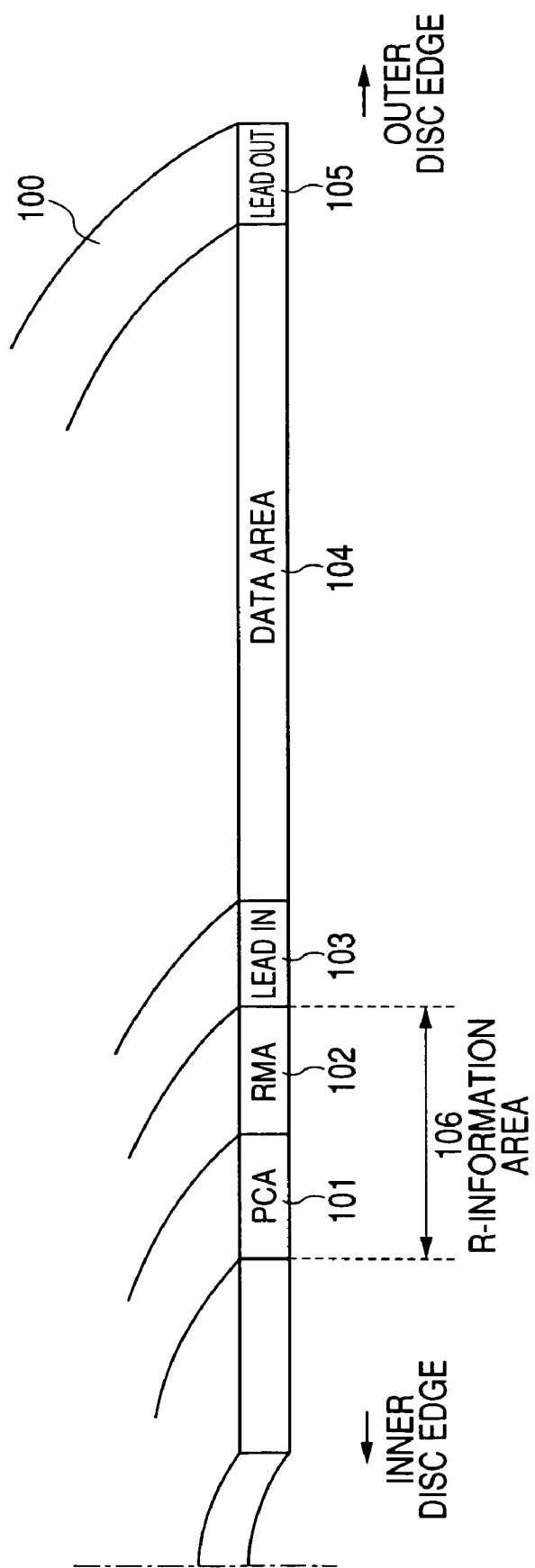
FIG. 2 is a diagram of a second prior-art DVD-R or DVD-RW.

FIG. 2 shows a prior-art DVD-R or DVD-RW 100. The prior-art disc 100 is of a single-recording-layer type. The prior-art disc 100 has a central opening, and thus has an inner circumferential edge in addition to an outer circumferential edge. As shown in FIG. 2, a recording area of the prior-art disc 100 is divided into a power calibration area (PCA) 101, a recording management area (RMA) 102, a lead-in area 103, a data area 104, and a lead-out area 105 which are successively arranged in that order as viewed in a radial direction from the inner disc edge toward the outer disc edge.

The PCA 101 and the RMA 102 constitute an R-information area 106. The data area 104 is assigned to user data. The lead-in area 103 and the lead-out area 105 are used as buffers for absorbing overruns of a recording and reproducing head (an optical pickup) of a prior-art optical-disc drive apparatus. Management information and also information representing physical conditions of the whole of the prior-art disc 100 are stored in the lead-in area 103.

Figure 3:
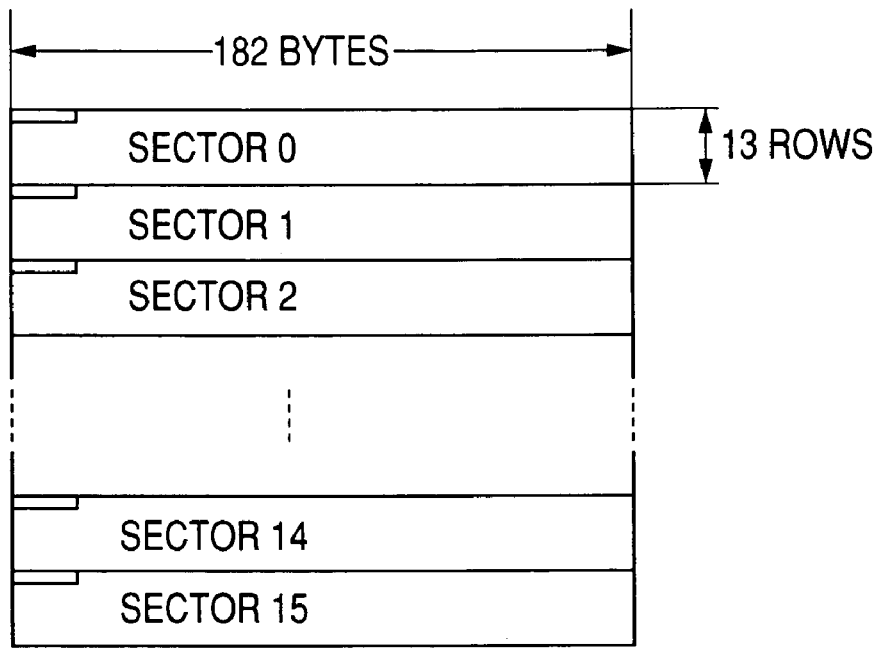
FIG. 3 is a diagram of the structure of one prior-art ECC block used for the data recording on a data area in an optical disc.

User data is recorded on the data area 104 for every ECC block. As shown in FIG. 3, one ECC block is divided into 16 sectors numbered "0", "1", "2", ..., "15". One sector consists of 13 rows each having 182 bytes. One ECC block contains 32-kilobyte user data, error detection and correction parities (error detection and correction code words), and sync signals.

Figure 4:
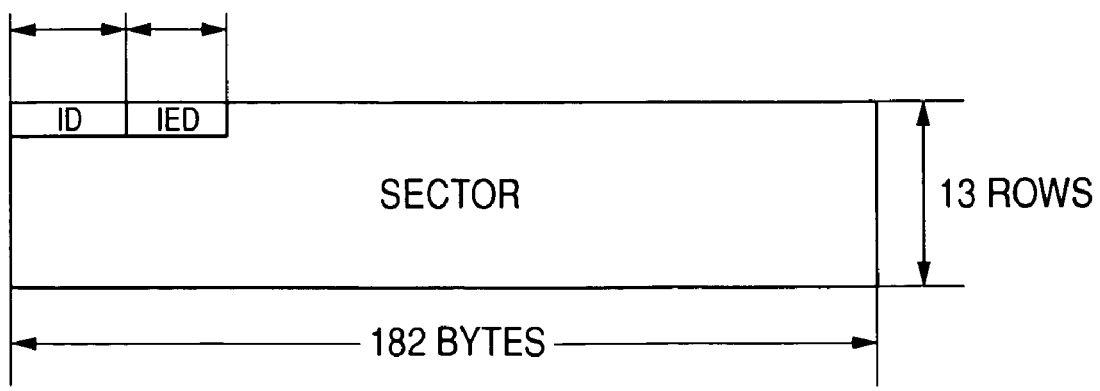
FIG. 4 is a diagram of the structure of one prior-art sector in the ECC block of FIG. 3.

As shown in FIG. 4, one sector has 4-byte ID (identification data) at its head. The 4-byte ID is followed by 2-byte IED (error detection and correction code words) therefor. The 4-byte ID represents a unique sector number, that is, an ID sector number which has a given relation with LPP (land pre-pit) ECC-block address information. The 4-byte ID is also referred to as the sector ID. The unique sector number represented by the 4-byte ID is equivalent to a sector address. Furthermore, the 4-byte ID represents the attributes of a disc area on which the related sector is recorded.

A prior-art drive apparatus for the prior-art disc 100 in FIG. 2 implements trial write and read before recording desired user data (for example, contents data) on the prior-art disc 100. During a first stage of the trial write and read, test signals are sequentially recorded on the PCA 101 in the prior-art disc 100 while the recording power of a laser beam is changed among different values. The test signals are assigned to the different recording powers of the laser beam, respectively. During a second stage of the trial write and read, the recorded test signals are reproduced, and the reproduced test signals are evaluated. An optimum recording power of the laser beam is decided on the basis of the results of the evaluation of the reproduced test signals. During the recording of desired user data on the prior-art disc 100 which follows the trial write and read, the recording power of the laser beam is controlled at the decided optimum level. Deciding the optimum recording power of the laser beam on the basis of the reproduced test signals is called OPC (optimum power control). The PCA 101 is used for the OPC.

The RMA 102 in the prior-art disc 100 is assigned to recording management information (recording management data) which includes information for managing changes in the recording states of the lead-in area 103, the data area 104, and the lead-out area 105, and information for managing OPC-related information. The recording management information is recorded on the RMA 102 for every RMD (recording management data) block. Similar to one ECC block for user data, one RMD block has a recording management information piece, and error detection and correction code words therefor.

The data structure of the RMA 102 depends on whether the prior-art disc 100 is a DVD-R or a DVD-RW. In the case of the prior-art disc 100 is a DVD-RW, the data structure of the RMA 102 depends on whether the prior-art disc 100 is used in an incremental recording mode or a restricted overwrite mode.

Figure 5:
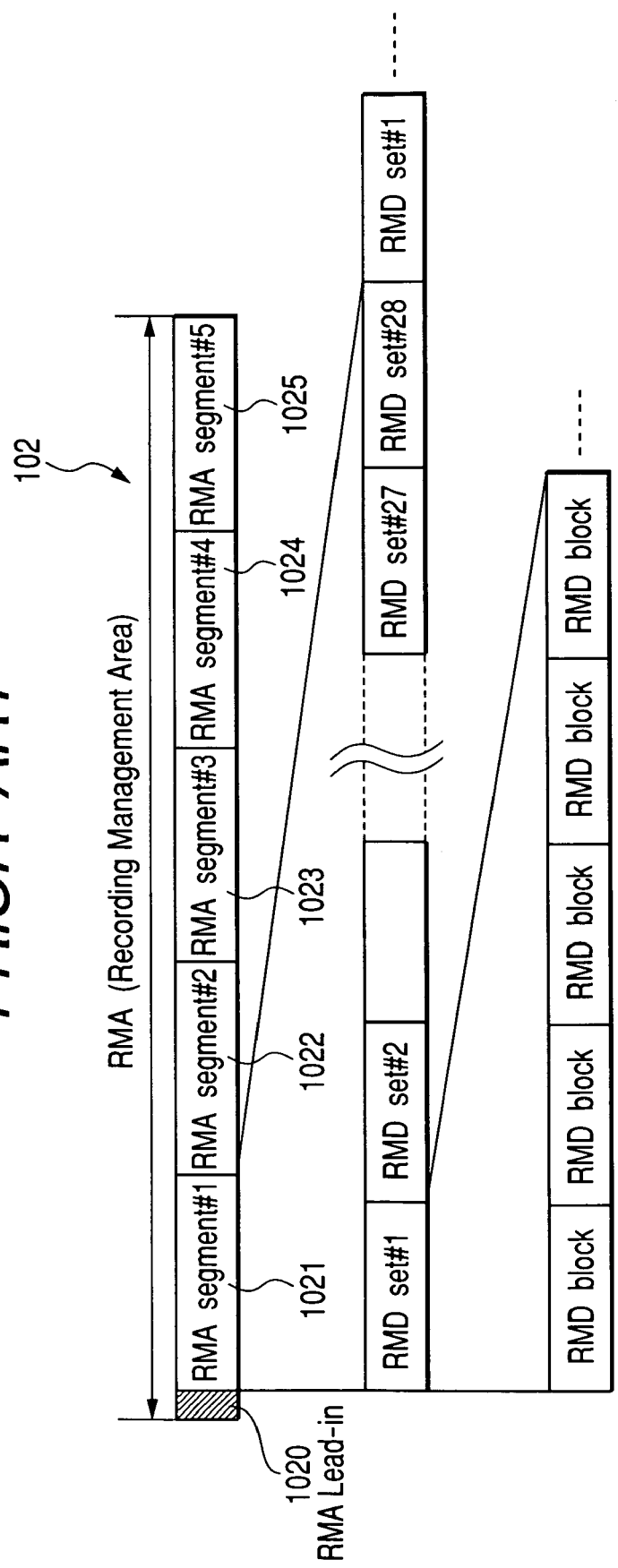
FIG. 5 is a diagram of the structure of an RMA (a recording management area) in the prior-art DVD-R or DVD-RW of FIG. 2.

FIG. 5 shows the data structure of the RMA 102 which occurs in the case where the prior-art disc 100 is a DVD-RW used in the overwriting mode. As shown in FIG. 5, the RMA 102 is composed of an RMA lead-in area 1020 and five RMA segments 1021-1025. The RMA lead-in area 1020 denotes the start of the RMA 102. The RMA segments 1021-1025 are numbered #1-#5. Each of the RMA segments 1021-1025 is divided into portions assigned to 28 RMD sets respectively. The RMD sets are numbered #1-#28. Each of the RMD sets is composed of 5 RMD blocks.

The 5 RMD blocks constituting one RMD set are the same in data contents. Thus, the same-contents RMD block is written 5 times. The stored data can vary from RMD set to RMD set.

The first one among the 28 RMD sets has RMD of a prescribed format, "Format2". The 27 remaining RMD sets have RMD of a prescribed format, "Format3". The RMD of "Format3" contains information for managing changes in the actual recording states, and also information about a defective ECC block or blocks in the data area 104. At a certain time point, only one among the 27 RMD sets related to "Format3" is effective. A pointer for the effective RMD set is stored in the RMD set related to "Format2".

Each time user data is written or rewritten in the prior-art disc (DVD-RW) 100, the 5 RMD blocks constituting the effective RMD set related to "Format3" are rewritten or updated accordingly. As the number of times of the rewriting increases, the recording layer in the prior-art disc 100 deteriorates so that data or information recorded thereon and reproduced therefrom has an increased number of errors.

When the prior-art disc 100 is new, the portions of the RMA segment #1 are used which correspond to the RMD set #1 and the RMD set #2 respectively (see FIG. 5). Five RMD blocks related to "Format2" are recorded to constitute the RMD set #1. Five RMD blocks related to "Format3" are recorded to constitute the RMD set #2. The RMD of "Format2" in the RMD set #1 contains a pointer for the RMD set #2 which denotes that the RMD set #2 is effective. As user data is repetitively written or rewritten in the prior-art disc 100, the RMD set #2 is also repetitively rewritten or updated. As the number of times of the rewriting of the RMD set #2 increases, the number of errors in the 5 RMD blocks constituting the RMD set #2 also increases. Then, one or more of the 5 RMD blocks each have a number of errors beyond the error correction limit. Such a RMD block or blocks are referred to as an error-uncorrectable RMD block or blocks.

When the number of error-uncorrectable RMD blocks in the RMD set #2 reaches three or more, the use of the RMD set #2 is quit and the portion of the RMA segment #1 which corresponds to the RMD set #3 starts to be used. Five RMD blocks related to "Format3" are recorded to constitute the RMD set #3. At the same time, a pointer for the RMD set #3 is stored in the RMD of "Format2" in the RMD set #1. The pointer denotes that the RMD set #3 is effective.

The above operation steps are iterated. When the RMD set #28 in the RMA segment #1 is used up, the RMA segment #2 starts to be used instead of the RMA segment #1. User data can be repetitively written or rewritten in the prior-art disc 100 until the RMD set #28 in the RMA segment #5 is used up.

In the case where the prior-art disc 100 is a DVD-R, the prior-art drive apparatus finalizes the prior-art disc 100 after writing user data thereon. The finalization process enables a DVD player to reproduce the user data from the prior-art disc 100. During the finalization, prescribed data is recorded on the lead-in area 103, the lead-out area 105, and an unused part of the data area 104.

Figure 6:
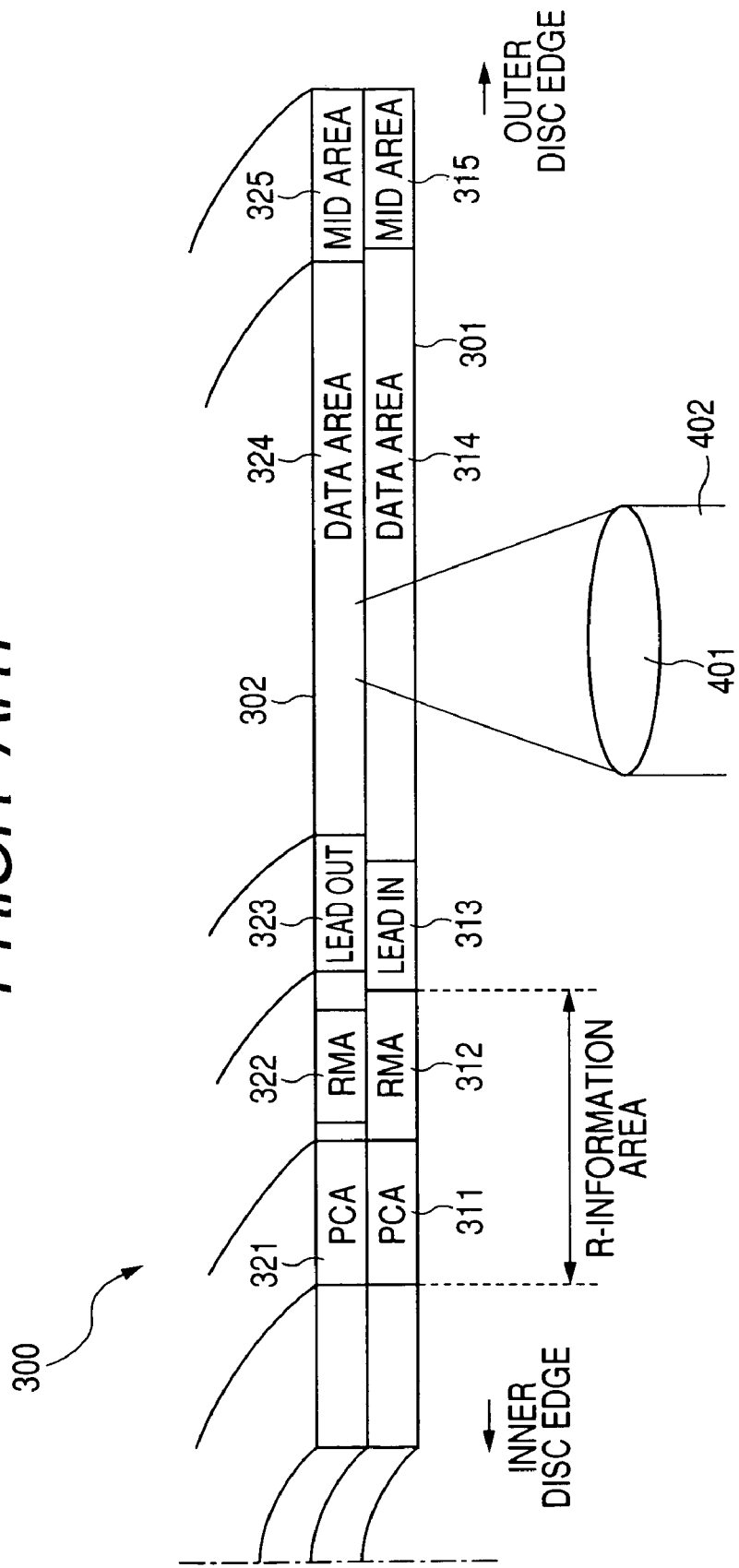
FIG. 6 is a diagram of a third prior-art DVD-R.

FIG. 6 shows a prior-art DVD-R 300. The prior-art disc 300 is of a two-layer single-sided type. The prior-art disc 300 has a laminated structure including a first recording layer 301 and a second recording layer 302 which are successively arranged in an axial direction of a laser beam 402 (or an axial direction of the disc 300). The first recording layer 301 is closer to an optical pickup (a recording and reproducing head) of a prior-art optical-disc drive apparatus than the second recording layer 302 is. An objective lens 401 in the optical pickup focuses the laser beam 402 onto either the first recording layer 301 or the second recording layer 302. The laser beam 402 reaches the second recording layer 302 after passing through the first recording layer 301.

The first recording layer 301 is divided into a PCA 311, an RMA 312, a lead-in area 313, a data area 314, and a middle area 315 which are successively arranged in that order as viewed along a radial direction from the inner disc edge toward the outer disc edge. The PCA 311 and the RMA 312 constitute an R-information area. The second recording layer 302 is divided into a PCA 321, an RMA 322, a lead-out area 323, a data area 324, and a middle area 325 which are successively arranged in that order as viewed along a radial direction from the inner disc edge toward the outer disc edge. The PCA 321 and the RMA 322 constitute an R-information area. The PCAs 311 and 321 are substantially equal in size, and align with each other. In other words, the PCAs 311 and 321 substantially entirely overlap each other.

The first recording layer 301 is similar to the recording layer in the prior-art disc 100 of FIG. 2 except that the middle area 315 replaces the lead-out area 105 (see FIG. 2). The second recording layer 302 is similar to the first recording layer 301 except that the lead-out area 323 replaces the lead-in area 313. The first recording layer 301 is scanned in a direction from the inner disc edge toward the outer disc edge during the recording of data thereon. The second recording layer 302 is scanned in a direction from the outer disc edge toward the inner disc edge during the recording of data thereon.

A prior-art drive apparatus finalizes the prior-art disc 300 after writing user data therein. The finalization enables a DVD player to reproduce the user data from the prior-art disc 300.

Figure 7:
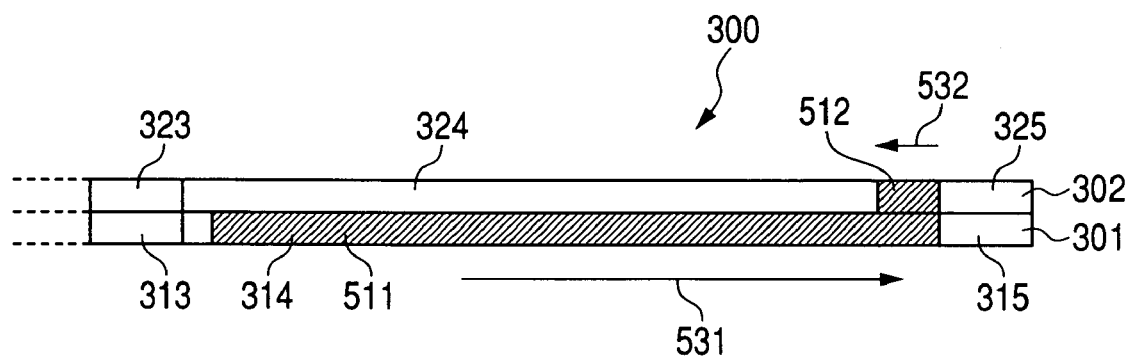
FIG. 7 is a sectional diagram of the prior-art DVD-R of FIG. 6 which is in a state occurring at a given stage.

With reference to FIG. 7, user data is recorded in the whole of the data area 314 of the first recording layer 301 along a scanning direction 531 to form a full-range used data area 511. Then, user data is recorded in a part of the data area 324 of the second recording layer 302 along a scanning direction 532 to form a partial-range used data area 512.

Figure 8:
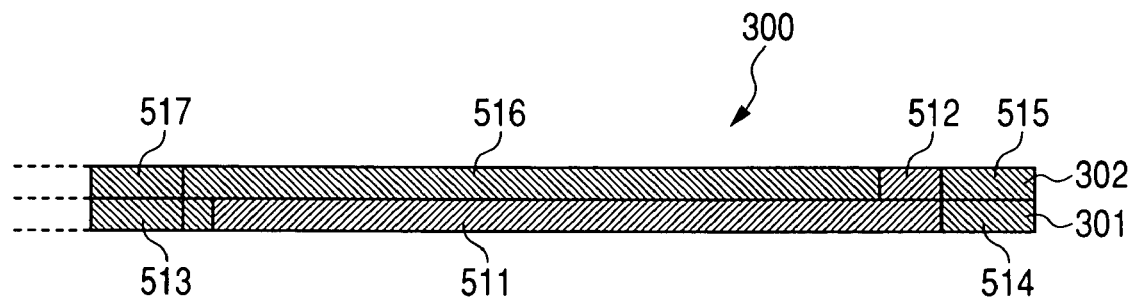
FIG. 8 is a sectional diagram of the prior-art DVD-R of FIG. 6 which is in a state occurring at a stage after that in FIG. 7.

When the prior-art disc 300 in the conditions of FIG. 7 is finalized, the conditions of the prior-art disc 300 change to those of FIG. 8. During the finalization, prescribed data is recorded on the lead-in area 313 of the first recording layer 301, the middle area 315 of the first recording layer 301, the middle area 325 of the second recording layer 302, and the lead-out area 323 of the second recording layer 302. In addition, padding data with a lead-out attribute is recorded on the unused part of the data area 324 of the second recording layer 302. As a result, the lead-in area 313, the middle area 315, the middle area 325, the unused part of the data area 324, and the lead-out area 323 change to data recorded regions 513, 514, 515, 516, and 517 respectively.

Specifically, the padding data is recorded on the unused part of the data area 324 for every ECC block (see FIGS. 3 and 4). Each of sectors constituting one ECC block contains sector ID representative of a sector address. The sector ID includes data representing the attributes of a disc area on which the related sector is recorded. The attribute data in the sector ID is preset to "lead-out attribute".

During the drive of the prior-art disc 300 by the DVD player, the focus related to the laser beam 402 tends to undesirably shift in the axial direction due to a defect in the prior-art disc 300 or a vibration thereof. For example, the focus undesirably shifts from the first recording layer 301 to the second recording layer 302. In the event that the focus undesirably shifts from the used data region 511 of the first recording layer 301 to the padding data region 516 of the second recording layer 302, the DVD player starts reproducing the padding data from the prior-art disc 300. In this case, the DVD player senses sector ID in the reproduced padding data, and detects the focused position of the laser beam 402 relative of the prior-art disc 300 from the sensed sector ID. Thus, the DVD player recognizes that the laser beam 402 is undesirably focused on the second recording layer 302. Then, the DVD player controls the laser beam 402 to be focused back on the first recording layer 301.

On the other hand, in an assumed case where the padding data is absent from the unused part of the data area 324 of the second recording layer 302, when the focus related to the laser beam 402 undesirably shifts from the used data region 511 of the first recording layer 301 to the unused part of the data area 324 of the second recording layer 302, the DVD player can not detect the focused position of the laser beam 402 relative of the prior-art disc 300. Therefore, in this case, the DVD player can not focus the laser beam 402 back on the first recording layer 301.

There is a prior-art DVD-RW of a two-layer single-sided type. A prior-art drive apparatus finalizes the prior-art two-layer DVD-RW after writing user data therein. The finalization enables a DVD player to reproduce the user data from the prior-art two-layer DVD-RW. In the case where the data area of a second recording layer of the prior-art two-layer DVD-RW has an unused part, the finalization records padding data with a lead-out attribute over the whole of the unused part. When the unused part is great, the finalization tends to take a relatively long time.

First Embodiment

FIG. 9 shows an information recording and reproducing system including a host apparatus 10, an optical-disc drive apparatus 20, and an optical disc 30. The drive apparatus 20 and the optical disc 30 are in a first embodiment of this invention. The host apparatus 10 and the drive apparatus 20 are connected with each other. The optical disc 30 can be inserted into and ejected from the body of the drive apparatus 20.

The optical disc 30 is of a two-layer single-sided structure basically similar to that in FIG. 6. The optical disc 30 uses a digital versatile disc rewritable (DVD-RW). Specifically, the optical disc 30 includes a laminate of two recording layers each having a PCA (a trial write area), an RMA, a data area, and other areas. The optical disc 30 is formed with a central opening, and thus has an inner circumferential edge in addition to an outer circumferential edge. The optical disc 30 has prerecorded LPP (land pre-pit) address information.

The host apparatus 10 includes, for example, a personal computer. The host apparatus 10 can command the drive apparatus 20 to record information on the optical disc 30 or reproduce information therefrom. Furthermore, the host apparatus 10 can command the drive apparatus 20 to finalize the optical disc 30. It should be noted that the host apparatus 10 and the drive apparatus 20 may be located in a common casing. For example, the host apparatus 10 and the drive apparatus 20 are combined to form an optical-disc recorder or an optical-disc recordable player.

The drive apparatus 20 has not only the function of recording information on the optical disc 30 but also the function of reproducing information therefrom. The drive apparatus 20 reproduces the LPP address information from the optical disc 30. During the recording of information on the optical disc 30 or the reproduction of information therefrom, the drive apparatus 20 controls the currently-accessed position on the optical disc 30 according to the reproduced LPP address information.

The drive apparatus 20 includes a system controller 21, a recording and reproducing circuit 22, an optical pickup (a recording and reproducing head) 23, a program memory 24, a data memory 25, an internal bus 26, and an interface 27.

The system controller 21, the recording and reproducing circuit 22, the data memory 25, and the interface 27 are bidirectionally connected by the internal bus 26. The program memory 24 is connected with the system controller 21. The optical pickup 23 is connected with the recording and reproducing circuit 22. The optical pickup 23 can optically access the optical disc 30 which is placed at its normal position within the body of the drive apparatus 20. During the access to the optical disc 30, the optical pickup 23 applies a laser beam thereto and receives a reflected laser beam therefrom. The interface 27 is connected with the host apparatus 10.

The system controller 21 includes a signal processor or a CPU. The system controller 21 acts to control the whole of the drive apparatus 20 according to a control program (a computer program). The recording and reproducing circuit 22 implements writing and reading information in and from the optical disc 30 via the optical pickup 23. The program memory 24 stores the control program for the system controller 21. Data to be recorded on the optical disc 30, data reproduced from the optical disc 30, and recording management information can be written into and read out from the data memory 25, and temporarily stored therein. The optical pickup 23 optically writes and reads data into and from the optical disc 30 while applying the laser beam thereto. The interface 27 connects the host apparatus 10 and the internal bus 26.

The recording and reproducing circuit 22 and the optical pickup 23 cooperate to write and read user data (contents information), recording management information, and padding data in and from the optical disc 30.

The system controller 21, the recording and reproducing circuit 22, the optical pickup 23, the program memory 24, the data memory 25, the internal bus 26, and the interface 27 in the drive apparatus 20 constitute a computer system which operates according to the control program stored in the program memory 24. Therefore, the drive apparatus 20 operates in accordance with the control program. The control program is designed to enable the drive apparatus 20 and the devices 21-27 therein to implement the previously-mentioned operation steps and also operation steps indicated hereafter.

With reference to FIG. 10, the optical disc 30 includes a laminate of first and second recording layers 301 and 302. When the optical disc 30 is located in position within the drive apparatus 20, the first recording layer 301 is closer to the optical pickup 23 than the second recording layer 302 is. The laser beam emitted from the optical pickup 23 scans the first recording layer 301 along a direction from the inner disc edge toward the outer disc edge. On the other hand, the laser beam scans the second recording layer 302 along a direction from the outer disc edge toward the inner disc edge. The first recording layer 301 has an RMA (a recording management area) 312, a lead-in area 313, a data area 314, and a middle area 315 which are successively arranged in that order as viewed along a radial direction from the inner disc edge toward the outer disc edge. The second recording layer 302 has an RMA 322, a lead-out area 323, a data area 324, and a middle area 325 which are successively arranged in that order as viewed along a radial direction from the inner disc edge toward the outer disc edge. The RMAs 312 and 322 align with each other as viewed in the axial direction of the optical disc 30, that is, the axial direction of the laser beam emitted from the optical pickup 23. Similarly, the lead-in area 313 and the lead-out area 323 align with each other. The data areas 314 and 324 align with each other. The middle areas 315 and 325 align with each other. The disc conditions in FIG. 10 occur when the optical disc 30 is new. Thus, in FIG. 10, the first and second recording layers 301 and 302 are in their fully unused states.

Preferably, the RMA 312 and the RMA 322 are combined and handled as a single recording management area divided into segments numbered #1, #2, . . . (see FIG. 5).

With reference to FIG. 11, the drive apparatus 20 provides middle areas 317 and 327 in the data areas 314 and 324 of the first and second recording layers 301 and 302 respectively. The middle areas 317 and 327 are spaced radially inward from the middle areas 315 and 325. The middle areas 317 and 327 align with each other as viewed in the axial direction of the optical disc 30 (or the axial direction of the laser beam emitted from the optical pickup 23). Then, the drive apparatus 20 records user data in the portion of the data area 314 in the first recording layer 301 from the inner edge of the data area 314 to the boundary with the inner edge of the middle area 317 while scanning the portion of the data area 314 along a direction from the inner disc edge toward the outer disc edge.

As a result, a user-data-recorded region 601 is formed in the first recording layer 301. The recorded user data has a succession of dummy data and pure user data. The dummy data occupies an innermost part of the user-data-recorded region 601. Thereafter, the drive apparatus 20 records user data in the portion of the data area 324 in the second recording layer 302 from the boundary with the inner edge of the middle area 327 to a position corresponding to an ECC block address "A" while scanning the portion of the data area 324 along a direction from the outer disc edge toward the inner disc edge. As a result, a user-data-recorded region 602 is formed in the second recording layer 302. Providing the middle areas 317 and 327 is implemented by storing the start ECC block addresses of the middle areas 317 and 327 in a prescribed field of an RMD block and recording the resultant RMD block on the RMA 312 to form an RMD-recorded region 603 therein. The middle areas 317 and 327 are called the shifted middle areas 317 and 327.

FIG. 12 shows conditions of the optical disc 30 which occur as a result of finalizing the optical disc 30 in the conditions of FIG. 11. The drive apparatus 20 implements finalizing the optical disc 30 in accordance with a command from the host apparatus 10 which responds to, for example, user's instruction. During the finalization of the optical disc 30, the drive apparatus 20 changes the portion of the first recording layer 301 between the inner edge of the lead-in area 313 and the outer edge of the shifted middle area 317 into a data-recorded region (a used region). In addition, the drive apparatus 20 changes the portion of the second recording layer 302 between the outer edge of the shifted middle area 327 and the inner edge of the lead-out area 323 into a data-recorded region (a used region).

The details of the disc finalization are as follows. First, the drive apparatus 20 records prescribed data in a given part of the data area 314 in the first recording layer 301. Specifically, to enable the optical disc 30 to be played back by a DVD player, the drive apparatus 20 records a disc file system in a given part of the data area 314 which extends radially outward from its inner edge, and which forms the dummy-data-recorded portion of the user-data-recorded region 601. As a result, a file-system-recorded region 700 is formed in the first recording layer 301 (see FIG. 12).

Second, the drive apparatus 20 calculates the ECC block address "X" of a position a given interval inwardly distant from the inner edge of the user-data-recorded region 602 or from the position corresponding to the end ECC block address in the user-data-recorded region 602 (that is, corresponding to the ECC block address "A" in FIG. 11). The given interval is expressed by a prescribed address value corresponding to, for example, an on-disc radial width of 0.5 mm.

It should be noted that the ECC block address of the inner edge of the user-data-recorded region 602 may be directly used as the ECC block address "X".

Third, the drive apparatus 20 reads out the newest RMD block from the optical disc 30, and extracts the outermost data-recorded address field value "Y" from the read-out newest RMD block. The drive apparatus 20 compares the outermost data-recorded address field value "Y" with the ECC block address "X" to decide which of the value "Y" and the address "X" corresponds to an inner side with respect to the optical disc 30. The outermost data-recorded address field is intended to represent that all the sectors in the portion of the second recording layer 302 from the position denoted by the ECC block address in the outermost data-recorded address field to the inner edge of the lead-out area 323 or the boundary between the lead-out area 323 and the data area 324 have been used for recording data. At this time, the outermost data-recorded address field value "Y" is equal to "0" which denotes the innermost sector position occurring when the optical disc 30 is in its initial state. On the other hand, the ECC block address "X" is equal to a value corresponding to a position slightly inward of the position denoted by the ECC block address "A". Thus, the drive apparatus 20 decides that the ECC block address "X" corresponds to a position outward of the position denoted by the outermost data-recorded address field value "Y".

In this case, the drive apparatus 20 records padding data on prescribed unused portions of the optical disc 30 (see FIG. 11). Specifically, the drive apparatus 20 records padding data with a lead-out attribute or a data area attribute on the unused portion of the second recording layer 302 from the position denoted by the ECC block address "A" to the outer edge of the lead-out area 323. As a result, a padding-data-recorded region 701 is formed in the second recording layer 302 (see FIG. 12). The recording of the padding data is on an ECC-block by ECC-block basis (see FIGS. 3 and 4). Identification data (ID), which represents a sector address and the lead-out attribute or the data area attribute, is placed in each sector loaded with a portion of the padding data.

Thereafter, the drive apparatus 20 records prescribed data with a middle area attribute on the shifted middle area 317 in the first recording layer 301 while scanning the shifted middle area 317 along the direction from its inner edge toward its outer edge. Furthermore, the drive apparatus 20 records prescribed data with the middle area attribute on the shifted middle area 327 in the second recording layer 302 while scanning the shifted middle area 327 along the direction from its outer edge toward its inner edge. As a result, shifted middle area-data-recorded regions 702 and 703 are formed in the first and second recording layers 301 and 302 (see FIG. 12). Subsequently, the drive apparatus 20 records prescribed data on the lead-in area 313 (or the unused portion of the lead-in area 313). As a result, a lead-in-data-recorded region 704 is formed in the first recording layer 301 (see FIG. 12). The recorded prescribed data in the lead-in area 313 contains information representing an on-disc position up to which the user data has been recorded. Even a DVD player lacking the function of reading out information from the RMAs 312 and 322 can detect the on-disc position up to which user data has been recorded by reproducing information from the lead-in-data-recorded region 704 and then referring to the reproduced information. Thereafter, the drive apparatus 20 records prescribed data on the lead-out area 323. As a result, a lead-out-data-recorded region 705 is formed in the second recording layer 302 (see FIG. 12). In this way, the data-recorded regions 701-705 are formed during the disc finalization.

At an end of the disc finalization, the drive apparatus 20 gets information about the ECC block address "Y" of outermost one among the used sectors (the data-recorded sectors) in the second recording layer 302, and places the ECC block address "Y" in one RMD field and records the ECC block address "Y" on the RMA 312 as a part of an RMD block. Consequently, a data-recorded portion 706 is formed in the RMA 312 (see FIG. 12). The above RMD field is referred to as the outermost data-recorded address field. The outermost data-recorded address field is intended to represent that all the sectors in the portion of the second recording layer 302 from the position denoted by the ECC block address in the outermost data-recorded address field to the inner edge of the lead-out area 323 or the boundary between the lead-out area 323 and the data area 324 have been used for recording data. In FIG. 12, the ECC block address "Y" is equal to the ECC block address "B" of the outermost sector in the data-recorded shifted middle area 703.

With reference to FIG. 19, the outermost data-recorded address field is placed at byte positions BP of "8" to "11" in an RMD block. As shown in FIG. 19, data of "0" is stored in the outermost data-recorded address field in the case where the optical disc 30 has never been finalized. The data of "0" means an address value of "0" corresponding to the innermost sector position occurring when the optical disc 30 is in its initial state. With reference to FIG. 20, the ECC block address "B" is stored in the outermost data-recorded address field (byte positions BP of "8" to "11") after the disc finalization is carried out as shown in FIG. 12.

In the case where the drive apparatus 20 decides that the ECC block address "X" corresponds to a position inward of the position denoted by the outermost data-recorded address field value "Y", the following operation steps are implemented. The drive apparatus 20 concludes that the recording of the user data on the data area 324 in the second recording layer 302 has reached a position inward of or close to the position corresponding to the previous outermost data-recorded address. Then, the drive apparatus 20 records padding data on the unused portion of the data area 324 in the second recording layer 302 from the inner edge of the user-data-recorded portion and the position denoted by the ECC block address "X".

The drive apparatus 20 can reformat the optical disc 30 which has been finalized. Generally, the drive apparatus 20 implements reformatting the optical disc 30 in accordance with a command from the host apparatus 10 which responds to, for example, user's instruction. One can be selected from different modes of reformatting. A first reformatting mode is designed to format the whole of the optical disc 30. A second reformatting mode is a simple reformatting mode designed to record prescribed data on a partial disc area such as the RMA 312, the RMA 322, or the lead-in area 313. The second reformatting mode provides a shorter formatting time. The second reformatting mode is called the quick formatting.

FIG. 13 shows disc conditions occurring as a result of subjecting the optical disc 30 in the conditions of FIG. 12 to the quick formatting by the drive apparatus 20. In FIG. 13, data-rewritten regions 801 and 802 are formed by the quick formatting. The data-rewritten region 802 results from updating RMD in the portion of the RMA 312. The data-rewritten region 801 results from rewriting data in an outer portion of the lead-in area 313 and recording prescribed data in an inner portion of the data area 314. The other data-recorded disc areas remain in the states in FIG. 12. The address information about the middle areas 317 and 327 is absent from the updated RMD in the RMA portion 802. Accordingly, the regions 601, 602, 701, 702, and 703 are basically handled as unused ones. On the other hand, the outermost data-recorded address field value in the RMD remains the same during the updating of the RMD. Thus, the outermost data-recorded address field value in the updated RMD is equal to the ECC block address "B".

The drive apparatus 20 can newly record user data on the optical disc 30 which has been subjected to the quick formatting. FIG. 14 shows disc conditions occurring as a result of newly recording user data on the optical disc 30 in the conditions of FIG. 13. The newly recording of user data is as follows. The drive apparatus 20 provides the middle areas 315 and 325 at their original places. The drive apparatus 20 records user data on the portion of the data area 314 in the first recording layer 301 from the outer edge of the data-rewritten area 801 to the inner edge of the middle area 315. Consequently, a user-data-recorded region 605 is formed in the first recording layer 301 (see FIG. 14). Thereafter, the drive apparatus 20 records user data on the portion of the data area 324 in the second recording layer 302 from the inner edge of the middle area 325 to a position corresponding to an ECC block address "C". Consequently, a user-data-recorded region 606 is formed in the second recording layer 302 (see FIG. 14). In FIG. 14, the letter "Q" denotes the ECC block address of the boundary between the middle area 325 and the data area 324.

Figure 15:
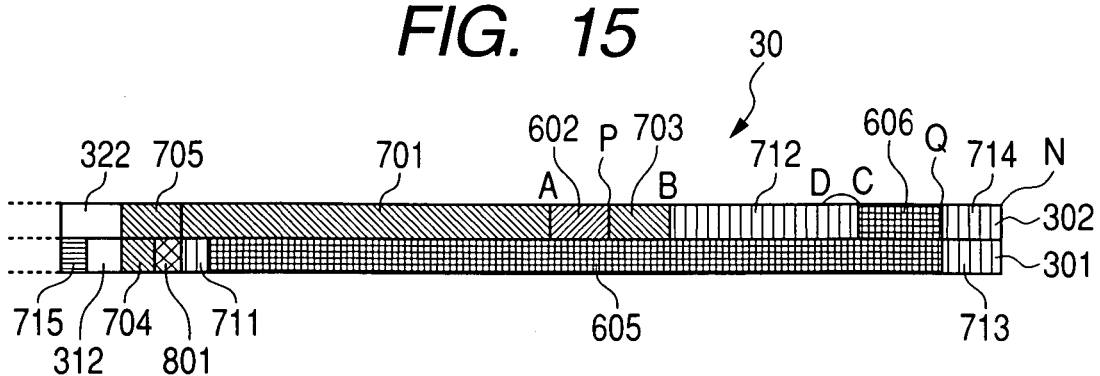

FIG. 15 shows conditions of the optical disc 30 which occur as a result of finalizing the optical disc 30 in the conditions of FIG. 14. The drive apparatus 20 implements finalizing the optical disc 30 in accordance with a command from the host apparatus 10 which responds to, for example, user's instruction. The details of the disc finalization are as follows. First, the drive apparatus 20 records prescribed data on a given part of the data area 314 in the first recording layer 301 which extends from its inner edge and forms an outer portion of the data-rewritten area 801. As a result, a data-recorded region 711 is formed in the first recording layer 301 (see FIG. 15).

Second, the drive apparatus 20 calculates the ECC block address "X" of a position a given interval inwardly distant from the inner edge of the user-data-recorded region 606 or from the position corresponding to the end ECC block address in the user-data-recorded region 606 (that is, corresponding to the ECC block address "C" in FIG. 14). The given interval is expressed by a prescribed address value corresponding to, for example, an on-disc radial width of 0.5 mm. In FIG. 15, the ECC block address "X" is shown as the ECC block address "D". The zone between the positions denoted by the ECC block addresses "C" and "D" ("X") forms a buffer region for overrun.

It should be noted that the ECC block address of the inner edge of the user-data-recorded region 606 may be directly used as the ECC block address "X".

Third, the drive apparatus 20 reads out the newest RMD block from the optical disc 30, and extracts the outermost data-recorded address field value "Y" from the read-out newest RMD block. The outermost data-recorded address field value "Y" is equal to the ECC block address "B" (see FIG. 14).

Fourth, the drive apparatus 20 compares the outermost data-recorded address field value "Y" (the ECC block address "B") with the ECC block address "X" (the ECC block address "D") to decide which of the value "Y" and the address "X" corresponds to an inner side with respect to the optical disc 30. In the disc conditions of FIG. 15, the drive apparatus 20 decides that the ECC block address "B" (the outermost data-recorded address field value "Y") corresponds to an inner side in comparison with the ECC block address "D" (the ECC block address "X").

In this case, the drive apparatus 20 records padding data with the lead-out attribute or the data attribute on the unused portion of the data area 324 in the second recording layer 302 from the position denoted by the ECC block address "C" to the position denoted by the ECC block address "B". As a result, a padding-data-recorded region 712 is formed in the second recording layer 302 (see FIG. 15). Furthermore, the drive apparatus 20 records prescribed data with the middle area attribute on the middle area 315 in the first recording layer 301 while scanning the middle area 315 along a direction from its inner edge toward its outer edge. As a result, a middle area-data-recorded region 713 is formed in the first recording layer 301 (see FIG. 15). In addition, the drive apparatus 20 records prescribed data with the middle area attribute on the middle area 325 in the second recording layer 302 while scanning the middle area 325 along a direction from the its outer edge toward its inner edge. As a result, a middle area-data-recorded region 714 is formed in the second recording layer 302 (see FIG. 15). Thereafter, the drive apparatus 20 records prescribed data over the used portions of the lead-in area 313 and the lead-out area 323 if necessary.

At an end of the disc finalization, the drive apparatus 20 gets information about the ECC block address "Y" of outermost one among the used sectors (the data-recorded sectors) in the second recording layer 302, and places the ECC block address "Y" in the related RMD field, that is, the outermost data-recorded address field and records the ECC block address "Y" on the RMA 312 as a part of an RMD block. Consequently, a data-recorded portion 715 is formed in the RMA 312 (see FIG. 15). The outermost data-recorded address field value "Y" is equal to the ECC block address "N" of the outer edge of the middle area 325 (the padding-data-recorded region 714) in the disc conditions of FIG. 15. With reference to FIG. 21, the ECC block address "N" is stored in the outermost data-recorded address field (byte positions BP of "8" to "11") after the disc finalization is carried out as explained above.

In the case where the drive apparatus 20 decides that the ECC block address "X" (the ECC block address "D") corresponds to a position inward of the position denoted by the outermost data-recorded address field value "Y" (the ECC block address "B"), the following operation steps are implemented. The drive apparatus 20 concludes that the recording of the user data on the data area 324 in the second recording layer 302 has reached a position inward of or close to the position corresponding to the previous outermost data-recorded address (the ECC block address "B"). Then, the drive apparatus 20 records padding data with the lead-out attribute on the portion of the data area 324 in the second recording layer 302 from the position denoted by the ECC block address "C" to the position denoted by the ECC block address "D".

Sometimes, there occurs case where user data has been newly recorded on only a portion of the data area 314 in the first recording layer 301 and hence the data area 324 in the second recording layer 302 does not have been newly loaded with user data before the implementation of the disc finalization. In this case, during the disc finalization, the drive apparatus 20 records padding data with the data area attribute on the unused portion of the data area 314 in the first recording layer 301 from the outer edge of the user-data-recorded portion to the inner edge of the middle area 315. With respect to the second recording layer 302, the drive apparatus 20 carries out the previously-mentioned steps of the disc finalization while using the ECC block address of the boundary between the data area 324 and the middle area 325 as the innermost data-recorded address in the user-data-recorded region.

As previously mentioned, the outermost data-recorded address field is provided in the RMD block, and the outermost data-recorded address field value "Y" is held at the time of the reformatting. This design causes the following advantage. It is sufficient for the drive apparatus 20 to record padding data with the lead-out attribute or the data attribute on only a portion of the data area 324 in the second recording layer 302 which extends inwardly up to the position corresponding to the ECC block address "B" or "D" rather than the inner edge of the data area 324. Therefore, the recording of the padding data takes a shorter time. Accordingly, the disc finalization also takes a shorter time.

In the disc conditions of FIG. 15, the middle area-data-recorded regions 713 and 714 are provided at their original places. Thus, the drive apparatus 20 does not record data on a portion of the optical disc 30 which extends outward of the middle areas 315 and 325. The RMD block may be loaded with the maximum address value (for example, 0xFF○○○FF), which can be represented by all the bits of the outermost data-recorded address field, instead of the ECC block address "N" of the outer edge of the middle area 325. In this case, since the recording of data on a disc portion extending outward of the position corresponding to the maximum address value can not be implemented by the drive apparatus 20, the maximum address value is held as the outermost data-recorded address field value "Y" thereafter.

The drive apparatus 20 can erase the recorded data from the whole of the optical disc 30 to substantially return the optical disc 30 to its virgin state. During the erasure of the recorded data from the whole of the optical disc 30, the drive apparatus 20 clears the outermost data-recorded address field of the RMD block.

As previously mentioned, at the time of the disc finalization, the ECC block address of the outer edge of the middle area 325 or the shifted middle area 327 in the second recording layer 302 is stored in the outermost data-recorded address field of the RMD block and is recorded on the optical disc 30. The address value "Y" in the outermost data-recorded address field of the RMD block is held even when the optical disc 30 is reformatted. At the time of the next disc finalization, the drive apparatus 20 reads out the outermost data-recorded address field value "Y" from the optical disc 30 to get the information about the position of the outer edge of a data-recorded disc area. The drive apparatus 20 utilizes this positional information for the disc finalization, thereby shortening the time taken by the disc finalization.

The address of the outer edge of a data-recorded region in the second recording layer 302 at the time of the disc finalization is substantially equal to that of the inner edge of an unused region therein. At the time of the disc finalization, the address of the outer edge of a data-recorded region in the second recording layer 302 is in one-to-one correspondence with the address of the outer edge of a data-recorded region in the first recording layer 301. Accordingly, the outermost data-recorded address field of the RMD block may be loaded with the address of the outer edge of the data-recorded region in the first recording layer 301 instead of the address of the outer edge of the data-recorded region in the second recording layer 302.

It should be noted that the given interval used for the calculation of the ECC block address "X" may be equal to "0" rather than an on-disc radial width of 0.5 mm.

The on-disc positional information may use sector numbers instead of ECC block addresses.

At the end of the disc finalization in FIG. 12, one RMD field may be loaded with the ECC block address "P" of the boundary between the user-data-recorded region 602 and the shifted middle area 703 in the second recording layer 302 rather than the ECC block address "B" of the outermost sector in the data-recorded shifted middle area 703 before being recorded on the RMA 312 of the optical disc 30 as a part of the RMD block which represents the outermost data-recorded address field value "Y".

Figure 16:
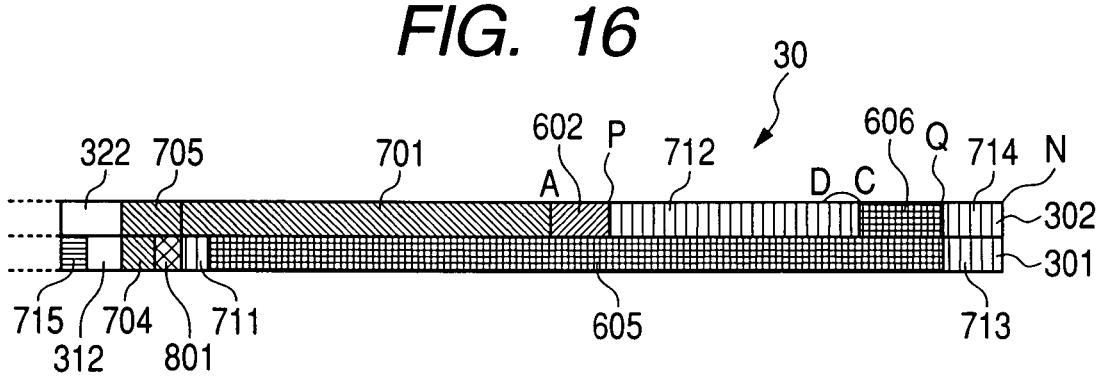

The shifted middle area 327 is very small in width. The on-disc radial width of the shifted middle area 327 is equal to, for example, about 0.5 mm. Therefore, the position of the shifted middle area 327 can be regarded as that of outermost one among the data-recorded sectors in the second recording layer 302. In this case, the ECC block address "P" is used as the outermost data-recorded address field value "Y". Thus, at the time of the disc finalization in FIG. 15, the ECC block address "P" is obtained by reading out the newest RMD block from the optical disc 30 and then extracting the outermost data-recorded address field value "Y" from the read-out newest RMD block. Accordingly, the drive apparatus 20 records padding data with the lead-out attribute or the data area attribute on the portion of the second recording layer 302 from the position denoted by the ECC block address "C" to the position denoted by the ECC block address "P" (the ECC block address "Y"). As a result, a padding-data-recorded region 712 is formed in the second recording layer 302 (see FIG. 16).

At the end of the disc finalization in FIG. 15, one RMD field may be loaded with the ECC block address "Q" of the boundary between the middle area 325 and the data area 324 in the second recording layer 302 rather than the ECC block address "N" of the outer edge of middle area 325 before being recorded on the RMA 312 of the optical disc 30 as a part of the RMD block which represents the outermost data-recorded address field value "Y". The middle area 325 is very small in width. The on-disc radial width of the middle area 325 is equal to, for example, about 0.5 mm. Therefore, the position of the middle area 325 can be regarded as that of outermost one among the data-recorded sectors in the second recording layer 302. In this case, the ECC block address "Q" is used as the outermost data-recorded address field value "Y".

Even during the recording of user data or padding data on the optical disc 30, when all the sectors in a region from the position denoted by a certain ECC block address to the inner edge of the lead-out area 323 or the boundary between the lead-out area 323 and the data area 324 have been used for the data recording, the foregoing ECC block address may be stored in the outermost data-recorded address field of the RMD block and then be recorded on the RMA 312.

FIGS. 10-16 show the case where the shifted middle areas 317 and 327 are provided at the time of the first data recording, and the user data is recorded by the second data recording on the disc area up to the position outward of the shifted middle areas 317 and 327. There is another case where the shifted middle areas 317 and 327 are provided at the time of the first data recording, and then the quick formatting and the second data recording are successively carried out, and where new shifted middle areas are provided inward of the shifted middle areas 317 and 327 at the time of the second data recording.

Figure 17:
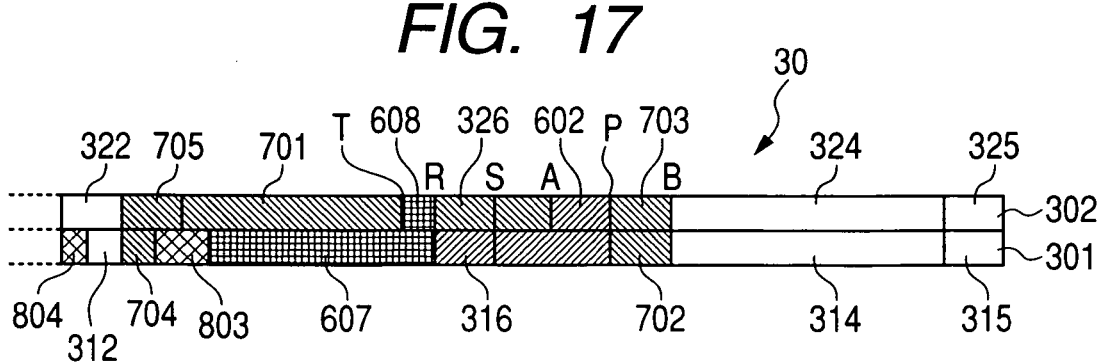

FIG. 17 shows conditions in such a case. Specifically, FIG. 17 shows disc conditions occurring as a result of subjecting the optical disc 30 in the conditions of FIG. 12 to the quick formatting, and then newly recording user data on the optical disc 30 by the drive apparatus 20. The quick formatting generates data-rewritten areas 803 and 804 (see FIG. 17). After the quick formatting, the drive apparatus 20 provides new shifted middle areas 316 and 326 in the data areas 314 and 324 of the first and second recording layers 301 and 302 respectively. The shifted middle areas 316 and 326 are spaced radially inward from the shifted middle areas 317 and 327. The shifted middle areas 316 and 326 align with each other as viewed in the axial direction of the optical disc 30 (or the axial direction of the laser beam emitted from the optical pickup 23). Then, the drive apparatus 20 records user data in the portion of the data area 314 in the first recording layer 301 from the outer edge of the data-rewritten area 803 to the inner edge of the shifted middle area 316. As a result, a user-data-recorded region 607 is formed in the first recording layer 301 (see FIG. 17). Thereafter, the drive apparatus 20 records user data in the portion of the data area 324 in the second recording layer 302 from the inner edge of the shifted middle area 326 to a position corresponding to an ECC block address "T". As a result, a user-data-recorded region 608 is formed in the second recording layer 302 (see FIG. 17).

Figure 18:
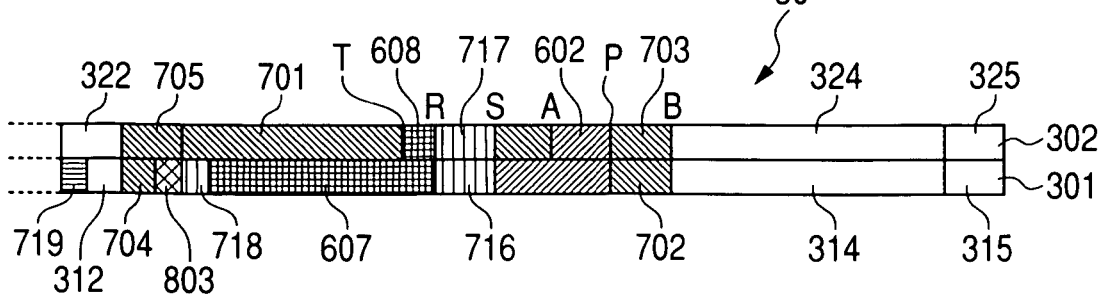

FIG. 18 shows conditions of the optical disc 30 which occur as a result of finalizing the optical disc 30 in the conditions of FIG. 17. The drive apparatus 20 implements finalizing the optical disc 30 in accordance with a command from the host apparatus 10 which responds to, for example, user's instruction. The details of the disc finalization are as follows. First, the drive apparatus 20 records prescribed data over an outer portion of the data-rewritten area 803. As a result, a data-recorded region 718 is formed in the first recording layer 301 (see FIG. 18).

Second, the drive apparatus 20 calculates the ECC block address "X" of a position a given interval inwardly distant from the inner edge of the user-data-recorded region 608 or from the position corresponding to the end ECC block address in the user-data-recorded region 608 (that is, corresponding to the ECC block address "T" in FIG. 17). Here, the given interval is equal to "0". Therefore, the ECC block address "X" is the same as the ECC block address "T".

Third, the drive apparatus 20 reads out the newest RMD block from the optical disc 30, and extracts the outermost data-recorded address field value "Y" from the read-out newest RMD block. The outermost data-recorded address field value "Y" is equal to the ECC block address "B" (see FIG. 12) since the ECC block address "B" of the outermost sector in the shifted middle area 327 has been set as the outermost data-recorded address field value "Y" at the time of the disc finalization in FIG. 12.

Fourth, the drive apparatus 20 compares the outermost data-recorded address field value "Y" (the ECC block address "B") with the ECC block address "X" (the ECC block address "T") to decide which of the value "Y" and the address "X" corresponds to an inner side with respect to the optical disc 30. In the disc conditions of FIG. 17, the drive apparatus 20 decides that the ECC block address "T" (the ECC block address "X") corresponds to an inner side in comparison with the ECC block address "B" (the outermost data-recorded address field value "Y").

In this case, since the ECC block address of the inner edge of the user-data-recorded region in the second recording layer 302 is the same as the ECC block address "X" (the ECC block address "T"), the drive apparatus 20 does not implement the recording of padding data on the disc portion from the inner edge of the user-data-recorded region in the second recording layer 302 to the position denoted by the ECC block address "X".

Fifth, the drive apparatus 20 records prescribed data with the middle area attribute on the shifted middle areas 316 and 326. As a result, a padding-data-recorded shifted middle areas 716 and 717 are formed (see FIG. 18).

At an end of the disc finalization, the drive apparatus 20 gets information about the ECC block address "Y" of outermost one among the used sectors (the data-recorded sectors) in the second recording layer 302, and places the ECC block address "Y" in the related RMD field, that is, the outermost data-recorded address field and records the ECC block address "Y" on the RMA 312 as a part of an RMD block. Specifically, the drive apparatus 20 compares the outermost data-recorded address field value "Y" (the ECC block address "B") extracted from the read-out newest RMD block with the ECC block address "S" of the outer edge of the shifted middle area 717 which corresponds to outermost one among the used sectors generated by the present data recording. According to the result of the comparison, the drive apparatus 20 decides that the ECC block address "B" (the outermost data-recorded address field value "Y") corresponds to an outer side in comparison with the ECC block address "S". Therefore, the drive apparatus 20 uses the ECC block address "B" as the ECC block address "Y" of outermost one among the used sectors in the second recording layer 302.

As previously mentioned, at the time of the disc finalization, the ECC block address of outermost one among the data-recorded sectors (the used sectors) in the second recording layer 302 is stored in the outermost data-recorded address field of the RMD block and is recorded on the optical disc 30. The address value "Y" in the outermost data-recorded address field of the RMD block is held even when the optical disc 30 is reformatted. At the time of the next disc finalization, the drive apparatus 20 reads out the outermost data-recorded address field value "Y" from the optical disc 30 to get the information about the position of the outer edge of a data-recorded disc area. The drive apparatus 20 utilizes this positional information for the disc finalization, thereby shortening the time taken by the disc finalization even in the case where the present shifted middles areas are provided inward of the previous shifted middle areas (or the original middle areas).

The drive apparatus 20 may skip comparing the outermost data-recorded address field value "Y" (the ECC block address "B") extracted from the read-out newest RMD block with the ECC block address "S" of the outer edge of the shifted middle area 717 which corresponds to outermost one among the used sectors generated by the present data recording. In this case, the drive apparatus 20 loads the outermost data-recorded address filed of the RMD block with the ECC block address "S" of the outermost sector in the shifted middle area 717 before recording the resultant RMD block on the RMA 312 of the optical disc 30. Alternatively, the drive apparatus 20 may load the outermost data-recorded address filed of the RMD block with the ECC block address "R" of the boundary between the present user-data-recorded region 608 and the shifted middle area 717 before recording the resultant RMD block on the RMA 312 of the optical disc 30.

In the optical disc 30 which has been finalized once, the prescribed data occupies the lead-in area 313 and the lead-out area 323. Thus, in the case where the recording of user data on the optical disc 30 and the next disc finalization are successively carried out thereafter, it is sufficient to rewrite only necessary portions of the first and second recording layers 301 and 302 except the lead-in area 313 and the lead-out area 323. Prescribed data may be re-recorded on at least one of the lead-in area 313 and the lead-out area 323.

Figure 22:
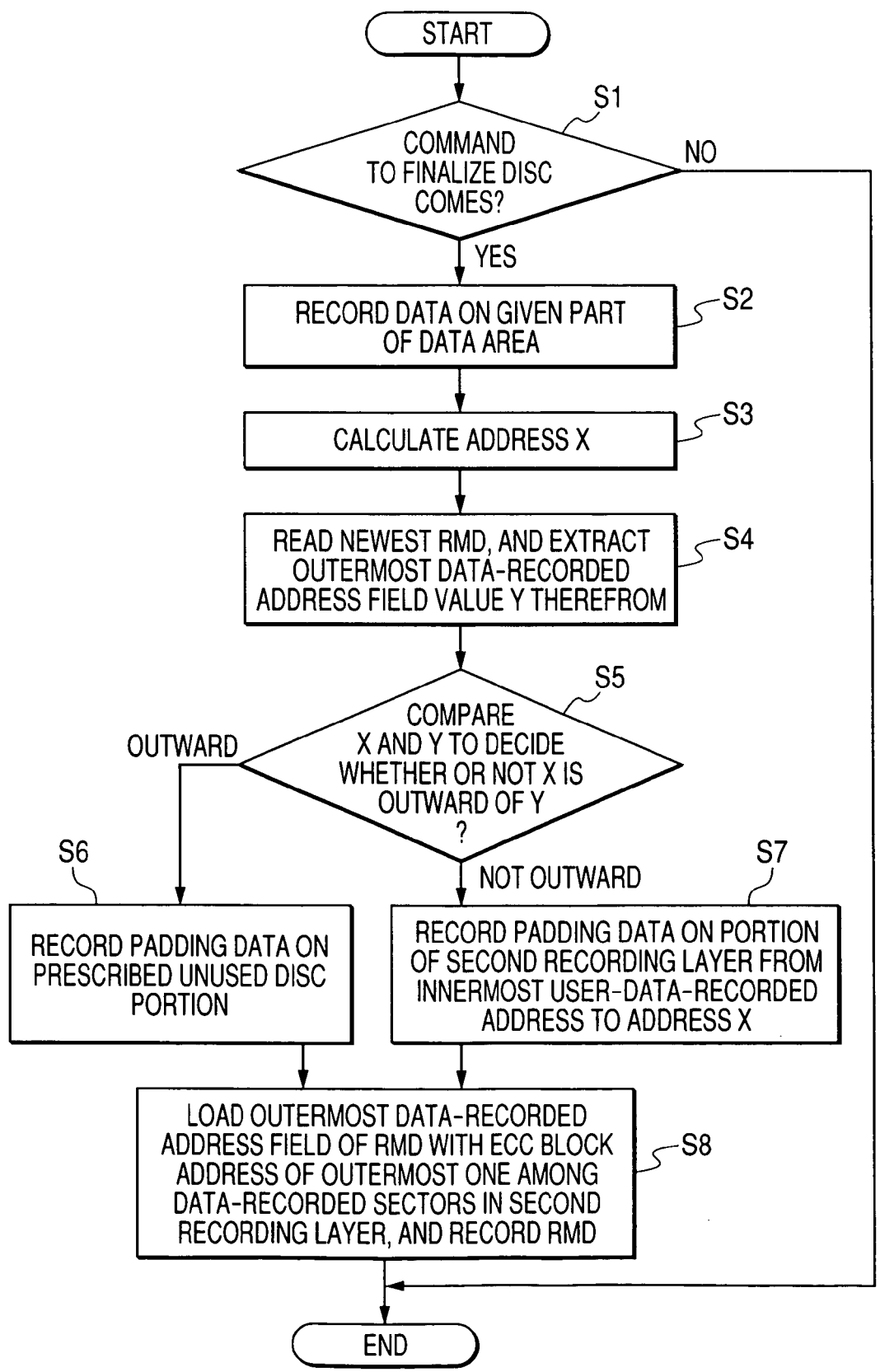
FIG. 22 is a flowchart of a segment of a control program for the optical-disc drive apparatus in FIG. 9.

FIG. 22 is a flowchart of a segment of the control program for the drive apparatus 20 (the system controller 21) which relates to the disc finalization. The program segment in FIG. 22 is repetitively executed.

As shown in FIG. 22, a first step S1 of the program segment decides whether or not a command to finalize the optical disc 30 comes from the host apparatus 10. When a command comes, the program advances from the step S1 to a step S2. Otherwise, the program exits from the step S1, and then the current execution cycle of the program segment ends.

The step S2 records a disc file system or prescribed data in a given part of the data area 314 in the first recording layer 301 which extends from its inner edge. For example, a file-system-recorded region 700 or a data-recorded region 711 is formed accordingly (see FIG. 12 or FIG. 15).

A step S3 following the step S2 calculates the ECC block address "X" of a position a given interval inwardly distant from the inner edge of user-data-recorded region in the second recording layer 302 or from the position corresponding to the end ECC block address in the user-data-recorded region (for example, the user-data-recorded region 602 or 608 in FIG. 15 or FIG. 17) in the second recording layer 302. The given interval is expressed by a prescribed address value corresponding to, for example, an on-disc radial width of 0.5 mm.

It should be noted that the ECC block address of the inner edge of the user-data-recorded region may be directly used as the ECC block address "X".

A step S4 subsequent to the step S3 reads out the newest RMD block from the optical disc 30, and extracts the outermost data-recorded address field value "Y" from the read-out newest RMD block.

A step S5 following the step S4 compares the outermost data-recorded address field value "Y" with the ECC block address "X" to decide which of the value "Y" and the address "X" corresponds to an inner side with respect to the optical disc 30. This decision is to determine whether an unused portion is present in or absent from the region of the second recording layer 302 between the positions denoted by the value "Y" and the address "X". When the ECC block address "X" corresponds to an outer side in comparison with the outermost data-recorded address field value "Y", that is, when an unused portion is present in the region of the second recording layer 302 between the positions denoted by the value "Y" and the address "X", the program advances from the step S5 to a step S6. Otherwise, the program advances from the step S5 to a step S7.

The step S6 records padding data on the unused portion of the data area 324 in the second recording layer 302 from the inner edge of the user-data-recorded portion to the position denoted by the ECC block address "Y". For example, a region 712 (see FIG. 15) is generated accordingly. After the step S6, the program advances to a step S8.

The step S7 records padding data on the portion of the data area 324 in the second recording layer 302 from the inner edge of the user-data-recorded portion to the position denoted by the ECC block address "X". After the step S7, the program advances to the step S8.

The step S8 gets information about the ECC block address "Y" of outermost one among the used sectors (the data-recorded sectors) in the second recording layer 302. The step S8 places the ECC block address "Y" in the outermost data-recorded address field of an RMD block. The step S8 records the resultant RMD block on the RMA 312 of the optical disc 30. Thus, the ECC block address "Y" of outermost one among the used sectors in the second recording layer 302 is recorded on the optical disc 30 as a part of the RMD block which represents the outermost data-recorded address field value. After the step S8, the current execution cycle of the program segment ends.

Second Embodiment

A second embodiment of this invention is similar to the first embodiment thereof except for design changes described hereafter. According to the second embodiment of this invention, the drive apparatus 20 uses a data recording method called "multi-border".

In the multi-border method, a border-in area and a border-out area are provided in an optical disc 30. The border-in area serves as a lead-in area. The border-out area serves as a lead-out area. An original lead-in area and an original lead-out can be used as a border-in area and a border-out area, respectively. The disc area between the border-in area (or the lead-in area) and the border-out area (or the lead-out area) is referred to as the bordered area. Closing the bordered area enables a DVD player to reproduce user data from the bordered area. Accordingly, closing the bordered area corresponds to finalizing the optical disc 30. A new bordered area can be added to the optical disc 30 which is spaced radially outward from the old bordered area. Closing the bordered area is also called a bordered-area closing process.

Figure 23:
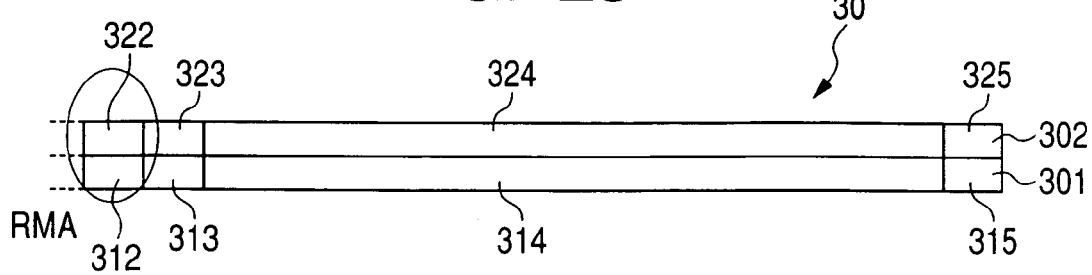
FIGS. 23-30 are sectional diagrams of an optical disc in a second embodiment of this invention which is in states occurring at different stages respectively.

FIG. 23 shows conditions of the optical disc 30 which is new. Thus, in FIG. 23, the first and second recording layers 301 and 302 of the optical disc 30 are in their fully unused states.

Figure 24:
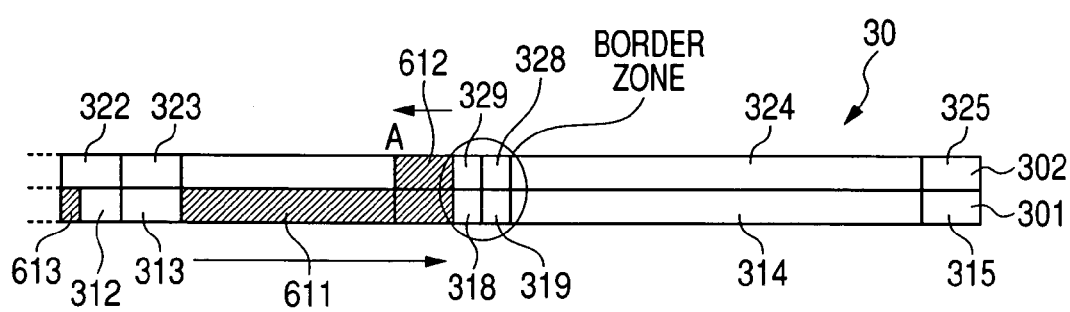

With reference to FIG. 24, the drive apparatus 20 provides a border zone composed of a border-out area 318 and a border-in area 319 in the first recording layer 301 which extends radially inward of the outer disc edge. Furthermore, the drive apparatus 20 provides a border zone composed of a border-out area 328 and a border-in area 329 in the second recording layer 302 which extends radially inward of the outer disc edge. The border zone in the first recording layer 301 and the border zone in the second recording layer 302 align with each other as viewed in the axial direction of the optical disc 30 (or the axial direction of the laser beam emitted from the optical pickup 23). Then, the drive apparatus 20 records user data in the portion of the data area 314 in the first recording layer 301 from the inner edge of the data area 314 to the inner edge of the border-out area 318. As a result, a user-data-recorded region 611 is formed in the first recording layer 301. The recorded user data has a succession of dummy data and pure user data. The dummy data occupies an innermost part of the user-data-recorded region 611. Thereafter, the drive apparatus 20 records user data in the portion of the data area 324 in the second recording layer 302 from the inner edge of the border-in area 329 to a position corresponding to an ECC block address "A". As a result, a user-data-recorded region 612 is formed in the second recording layer 302. Providing the border zones is implemented by storing the start ECC block addresses of the border zones in a prescribed field of an RMD block and recording the resultant RMD block on the RMA 312 to form an RMD-recorded region 613 therein.

Figure 25:
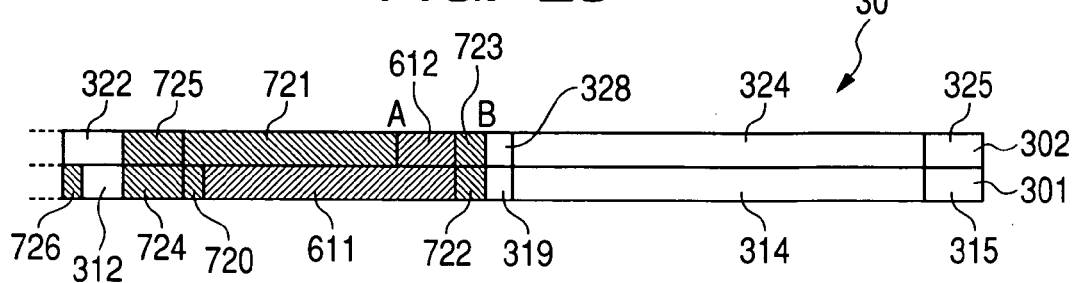

FIG. 25 shows conditions of the optical disc 30 which occur as a result of closing the bordered areas in the optical disc 30 in the conditions of FIG. 24. The drive apparatus 20 implements closing the bordered areas in accordance with a command from the host apparatus 10 which responds to, for example, user's instruction. During the closing of the bordered areas, the drive apparatus 20 changes the portion of the first recording layer 301 between the inner edge of the lead-in area 313 and the outer edge of the border-out area 318 into a data-recorded region (a used region). In addition, the drive apparatus 20 changes the portion of the second recording layer 302 between the outer edge of the border-in area 329 and the inner edge of the lead-out area 323 into a data-recorded region (a used region).

The details of the closing of the bordered areas are as follows. First, the drive apparatus 20 records prescribed data in a given part of the data area 314 in the first recording layer 301. Specifically, to enable the optical disc 30 to be played back by a DVD player, the drive apparatus 20 records a disc file system in a given part of the data area 314 which extends radially outward from its inner edge, and which forms the dummy-data-recorded portion of the user-data-recorded region 611. As a result, a file-system-recorded region 720 is formed in the first recording layer 301 (see FIG. 25).

Second, the drive apparatus 20 gets information about the position of the inner edge of the user-data-recorded region 612 of the second recording layer 302 or information about the end ECC block address "Z" in the user-data-recorded region 612, that is, the ECC block address "A" in FIG. 24.

Third, the drive apparatus 20 reads out the newest RMD block from the optical disc 30, and extracts the outermost data-recorded address field value "Y" from the read-out newest RMD block. The drive apparatus 20 compares the outermost data-recorded address field value "Y" with the ECC block address "Z" to decide which of the value "Y" and the address "Z" corresponds to an inner side with respect to the optical disc 30. The outermost data-recorded address field is intended to represent that all the sectors in the portion of the second recording layer 302 from the position denoted by the ECC block address in the outermost data-recorded address field to the inner edge of the lead-out area 323 have been used for recording data. At this time, the outermost data-recorded address field value "Y" is equal to "0" which denotes the innermost sector position occurring when the optical disc 30 is in its initial state. On the other hand, the ECC block address "Z" is equal to the ECC block address "A". Thus, the drive apparatus 20 decides that the ECC block address "Z" corresponds to a position outward of the position denoted by the outermost data-recorded address field value "Y".

In this case, the drive apparatus 20 records padding data on prescribed unused portions of the optical disc 30 (see FIG. 24) which include a prescribed unused portion adjoining the position denoted by the ECC block address "Z". Specifically, the drive apparatus 20 records padding data with the lead-out attribute or the data area attribute on the unused portion of the second recording layer 302 from the position denoted by the ECC block address "A" to the outer edge of the lead-out area 323. As a result, a padding-data-recorded region 721 is formed in the second recording layer 302 (see FIG. 25).

Thereafter, the drive apparatus 20 records prescribed data (padding data) on the border-out area 318 in the first recording layer 301 while scanning the border-out area 318 along the direction from its inner edge toward its outer edge. As a result, a data-recorded border-out region 722 is formed in the first recording layer 301 (see FIG. 25). Furthermore, the drive apparatus 20 records prescribed data (padding data) on the border-in area 329 in the second recording layer 302 while scanning the border-in area 329 along the direction from its outer edge toward its inner edge. As a result, a data-recorded border-in region 723 is formed in the second recording layer 302 (see FIG. 25). Subsequently, the drive apparatus 20 records padding data on the lead-in area 313 (or the unused portion of the lead-in area 313). As a result, a padding-data-recorded region 724 is formed in the first recording layer 301 (see FIG. 25). The recorded padding data in the lead-in area 313 contains information representing an on-disc position up to which the user data has been recorded. Even a DVD player lacking the function of reading out information from the RMAs 312 and 322 can detect the on-disc position up to which user data has been recorded by reproducing information from the padding-data-recorded region 724 and then referring to the reproduced information. Thereafter, the drive apparatus 20 records padding data on the lead-out area 323. As a result, a padding-data-recorded region 725 is formed in the second recording layer 302 (see FIG. 25). In this way, the padding-data-recorded regions 721-725 are formed during the closing of the bordered areas.

At an end of the closing of the bordered areas, the drive apparatus 20 gets information about the ECC block address "Y" of outermost one among the used sectors (the data-recorded sectors) in the second recording layer 302, and places the ECC block address "Y" in one RMD field, that is, the outermost data-recorded address field and records the ECC block address "Y" on the RMA 312 as a part of an RMD block. Consequently, a data-recorded portion 726 is formed in the RMA 312 (see FIG. 12). In FIG. 25, the ECC block address "Y" is equal to the ECC block address "B" of the outermost sector in the data-recorded border-in region 723.

With reference to FIG. 31, the outermost data-recorded address field is placed at byte positions BP of "8" to "11" in an RMD block. As shown in FIG. 31, data of "0" is stored in the outermost data-recorded address field in the case where the optical disc 30 has never been subjected to the finalizing process or the bordered-area closing process. With reference to FIG. 32, the ECC block address "B" is stored in the outermost data-recorded address field (byte positions BP of "8" to "11") after the closing of the bordered areas is carried out as shown in FIG. 25.

In the case where the drive apparatus 20 decides that the ECC block address "Z" corresponds to a position inward of the position denoted by the outermost data-recorded address field value "Y", the drive apparatus 20 concludes an unused portion to be absent from the present bordered area in the second recording layer 302. Accordingly, the drive apparatus 20 does not record padding data in connection with the present bordered area in the second recording layer 302.

Figure 26:
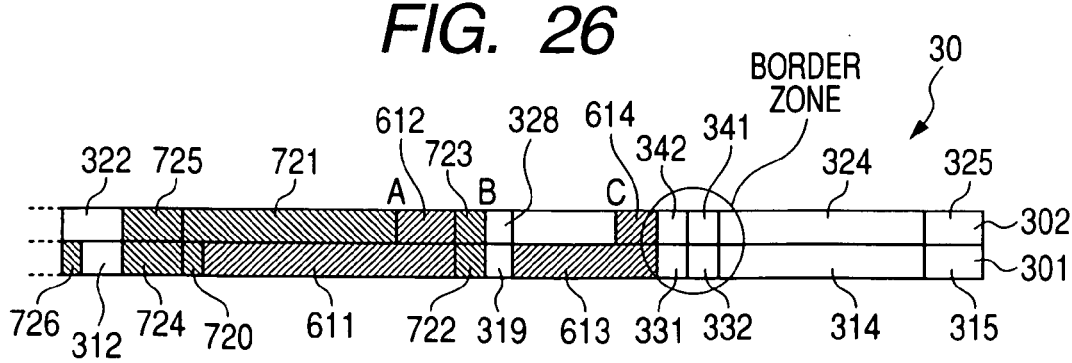

The drive apparatus 20 can provide new border zones in the optical disc 30 which extend outward of the old border zones. As shown in FIG. 26, the new border zone in the first recording layer 301 is composed of a border-out area 331 and a border-in area 332. The new border zone in the second recording layer 302 is composed of a border-out area 341 and a border-in area 342. The new border zone in the first recording layer 301 and the new border zone in the second recording layer 302 align with each other as viewed in the axial direction of the optical disc 30 (or the axial direction of the laser beam emitted from the optical pickup 23). Then, the drive apparatus 20 can additionally record user data on the optical disc 30 to form user-data-recorded regions 613 and 614 (see FIG. 26) in the first and second recording layers 301 and 302 respectively.

Figure 27:
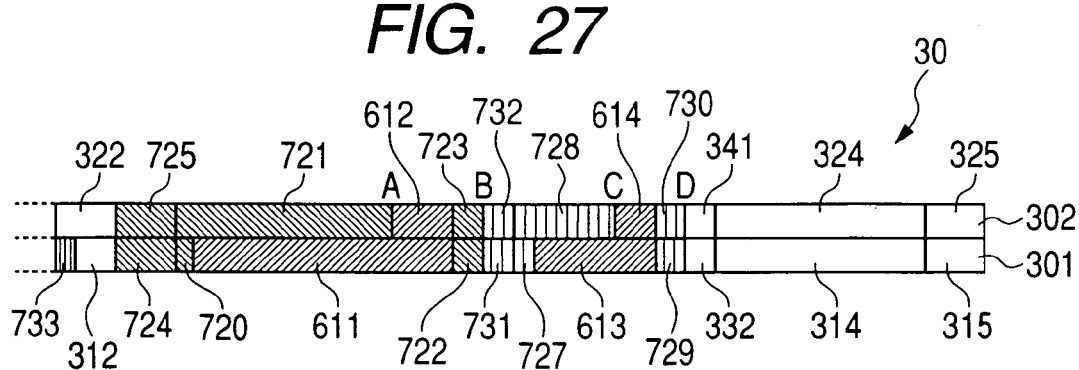

FIG. 27 shows conditions of the optical disc 30 which occur as a result of closing the bordered areas in the optical disc 30 in the conditions of FIG. 26. The drive apparatus 20 implements closing the bordered areas in the optical disc 30 in accordance with a command from the host apparatus 10 which responds to, for example, user's instruction. The details of the closing of the bordered areas are as follows. First, the drive apparatus 20 records prescribed data on a given part of the user-data-recorded region 613 in the first recording layer 301 which extends radially outward from its inner edge. As a result, a data-recorded region 727 is formed in the first recording layer 301 (see FIG. 27).

Second, the drive apparatus 20 gets information about the position of the inner edge of the user-data-recorded region 614 of the second recording layer 302 or information about the end ECC block address "Z" in the user-data-recorded region 614. In FIG. 26, the ECC block address "Z" is equal to the ECC block address "C".

Third, the drive apparatus 20 reads out the newest RMD block from the optical disc 30, and extracts the outermost data-recorded address field value "Y" from the read-out newest RMD block. The outermost data-recorded address field value "Y" is equal to the ECC block address "B" (see FIG. 26).

Fourth, the drive apparatus 20 compares the outermost data-recorded address field value "Y" (the ECC block address "B") with the ECC block address "Z" (the ECC block address "C") to decide which of the value "Y" and the address "Z" corresponds to an inner side with respect to the optical disc 30. In the disc conditions of FIG. 26, the drive apparatus 20 decides that the ECC block address "B" (the outermost data-recorded address field value "Y") corresponds to an inner side in comparison with the ECC block address "C" (the ECC block address "Z").

In this case, the drive apparatus 20 records padding data with the data area attribute on the unused portion of the data area 324 in the second recording layer 302 from the position denoted by the ECC block address "C" to the outer edge of the border-out area 328. As a result, a padding-data-recorded region 728 is formed in the second recording layer 302 (see FIG. 27). Furthermore, the drive apparatus 20 records prescribed data (padding data) on the border-out area 331 in the first recording layer 301 while scanning the border-out area 331 along the direction from its inner edge toward its outer edge. As a result, a data-recorded region 729 is formed in the first recording layer 301 (see FIG. 27). In addition, the drive apparatus 20 records prescribed data (padding data) on the border-in area 342 in the second recording layer 302 while scanning the border-in area 342 along the direction from its outer edge toward its inner edge. As a result, a data-recorded region 730 is formed in the second recording layer 302 (see FIG. 27). Thereafter, the drive apparatus 20 records prescribed data (padding data) on the border-in area 319 in the first recording layer 301 while scanning the border-in area 319 along the direction from its inner edge toward its outer edge. As a result, a data-recorded region 731 is formed in the first recording layer 301 (see FIG. 27). In addition, the drive apparatus 20 records prescribed data (padding data) on the border-out area 328 in the second recording layer 302 while scanning the border-out area 328 along the direction from its outer edge toward its inner edge. As a result, a data-recorded region 732 is formed in the second recording layer 302 (see FIG. 27). In this way, the padding-data-recorded regions 728-731 are formed during the closing of the bordered areas.

At an end of the closing of the bordered areas, the drive apparatus 20 gets information about the ECC block address "Y" of outermost one among the used sectors (the data-recorded sectors) in the second recording layer 302, and places the ECC block address "Y" in the related RMD field, that is, the outermost data-recorded address field and records the ECC block address "Y" on the RMA 312 as a part of an RMD block. Consequently, a data-recorded portion 733 is formed in the RMA 312 (see FIG. 27). The outermost data-recorded address field value "Y" is equal to the ECC block address "D" of the outer edge of the data-recorded border-in region 730 in the disc conditions of FIG. 27.

Specifically, the drive apparatus 20 compares the outermost data-recorded address field value "Y" (the ECC block address "B") extracted from the read-out newest RMD block with the ECC block address "D" of the outer edge of the data-recorded border-in region 730 which corresponds to outermost one among the used sectors generated by the present data recording. According to the result of the comparison, the drive apparatus 20 decides that the ECC block address "D" corresponds to an outer side in comparison with the ECC block address "B" (the outermost data-recorded address field value "Y"). Therefore, the drive apparatus 20 uses the ECC block address "D" as the ECC block address "Y" of outermost one among the used sectors in the second recording layer 302. Thus, as shown in FIG. 33, the drive apparatus 20 places the ECC block address "D" in the outermost data-recorded address field (byte positions BP of "8" to "11") of the RMD block.

In the case where the drive apparatus 20 decides that the ECC block address "Z" corresponds to a position inward of the position denoted by the outermost data-recorded address field value "Y", the drive apparatus 20 concludes an unused portion to be absent from the present bordered area in the second recording layer 302. Accordingly, the drive apparatus 20 does not record padding data in connection with the present bordered area in the second recording layer 302.

The drive apparatus 20 can reformat the optical disc 30 which has been subjected to the bordered-area closing process. Generally, the drive apparatus 20 implements reformatting the optical disc 30 in accordance with a command from the host apparatus 10 which responds to, for example, user's instruction. The reformatting of the optical disc 30 is of different types including a type called "quick formatting".

Figure 28:
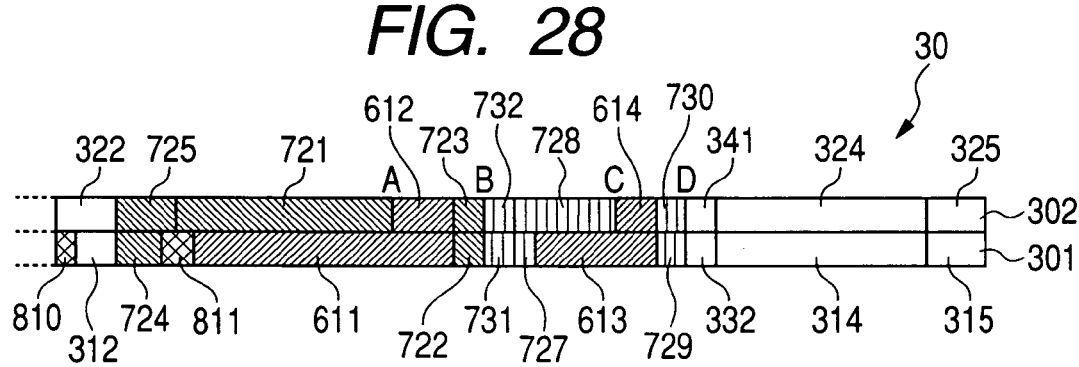
Figure 29:
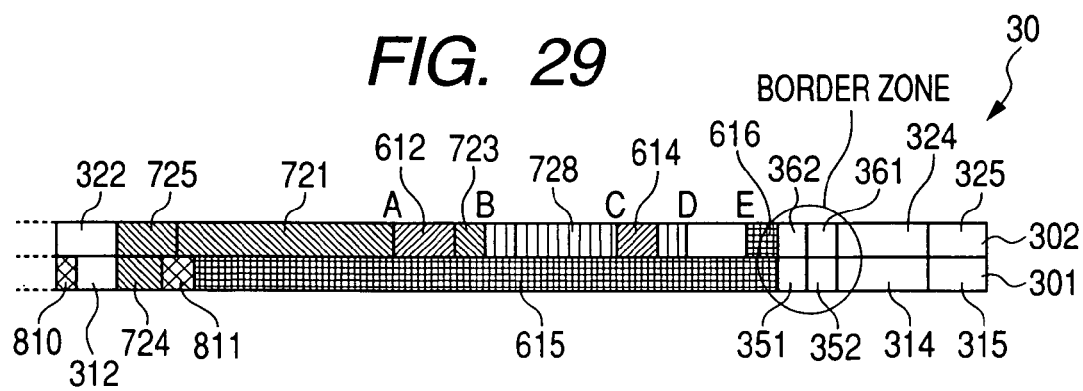

FIG. 28 shows disc conditions occurring as a result of subjecting the optical disc 30 in the conditions of FIG. 27 to the quick formatting by the drive apparatus 20. In FIG. 28, data-rewritten regions 810 and 811 are formed by the quick formatting. The data-rewritten region 810 results from updating RMD in the portion of the RMA 312. The data-rewritten region 811 results from rewriting data in an outer portion of the lead-in area 313 and recording prescribed data over an inner portion of the data area 314. The other data-recorded disc areas remain in the states in FIG. 27. The address information about the previous border zones is absent from the updated RMD in the RMA portion 810. Accordingly, the RMA portion 810 is basically handled as an unused region. On the other hand, the outermost data-recorded address field value in the RMD remains the same during the updating of the RMD. Thus, the outermost data-recorded address field value in the updated RMD is equal to the ECC block address The drive apparatus 20 handles the optical disc 30, which has been subjected to the quick formatting, as a new disc. Thus, the drive apparatus 20 can newly record user data on the optical disc 30 while disregarding the borders which have been provided in the optical disc 30. FIG. 29 shows disc conditions occurring as a result of newly recording user data on the optical disc 30 in the conditions of FIG. 28. The newly recording of user data is as follows. The drive apparatus 20 provides a border zone composed of a border-out area 351 and a border-in area 352 in the first recording layer 301 which extends radially inward of the outer disc edge. Furthermore, the drive apparatus 20 provides a border zone composed of a border-out area 361 and a border-in area 362 in the second recording layer 302 which extends radially inward of the outer disc edge. The border zone in the first recording layer 301 and the border zone in the second recording layer 302 align with each other as viewed in the axial direction of the optical disc 30 (or the axial direction of the laser beam emitted from the optical pickup 23). Then, the drive apparatus 20 records user data on the portion of the data area 314 in the first recording layer 301 from the outer edge of the data-rewritten area 811 to the inner edge of the border-out area 351. Consequently, a user-data-recorded region 615 is formed in the first recording layer 301 (see FIG. 29). Thereafter, the drive apparatus 20 records user data on the portion of the data area 324 in the second recording layer 302 from the inner edge of the border-in area 362 to a position corresponding to an ECC block address "E". Consequently, a user-data-recorded region 616 is formed in the second recording layer 302 (see FIG. 29).

Figure 30:
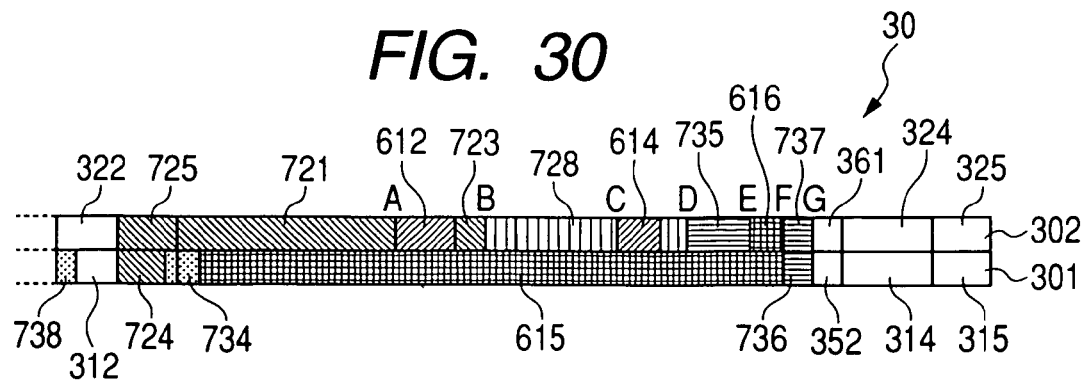

FIG. 30 shows conditions of the optical disc 30 which occur as a result of closing the bordered areas in the optical disc 30 in the conditions of FIG. 29. The drive apparatus 20 implements closing the bordered areas in the optical disc 30 in accordance with a command from the host apparatus 10 which responds to, for example, user's instruction. The details of the closing of the bordered areas are as follows. First, the drive apparatus 20 records prescribed data on a given part of the user-data-recorded region 615 in the first recording layer 301 which extends radially outward from its inner edge. As a result, a data-recorded region 734 is formed in the first recording layer 301 (see FIG. 30).

Second, the drive apparatus 20 gets information about the position of the inner edge of user-data-recorded region 616 of the second recording layer 302 or information about the end ECC block address "Z" in the user-data-recorded region 616. In FIG. 29, the ECC block address "Z" is equal to the ECC block address "E".

Third, the drive apparatus 20 reads out the newest RMD block from the optical disc 30, and extracts the outermost data-recorded address field value "Y" from the read-out newest RMD block. The outermost data-recorded address field value "Y" is equal to the ECC block address "D" (see FIG. 29).

Fourth, the drive apparatus 20 compares the outermost data-recorded address field value "Y" (the ECC block address "D") with the ECC block address "Z" (the ECC block address "E") to decide which of the value "Y" and the address "Z" corresponds to an inner side with respect to the optical disc 30. In the disc conditions of FIG. 29, the drive apparatus 20 decides that the ECC block address "D" (the outermost data-recorded address field value "Y") corresponds to an inner side in comparison with the ECC block address "E" (the ECC block address "Z").

In this case, the drive apparatus 20 records padding data on prescribed unused portions of the optical disc 30 (see FIG. 24). Specifically, the drive apparatus 20 records padding data with the data area attribute on the unused portion of the second recording layer 302 from the position denoted by the ECC block address "E" to the position denoted by the ECC block address "D". As a result, a padding-data-recorded region 735 is formed in the second recording layer 302 (see FIG. 30).

Thereafter, the drive apparatus 20 records prescribed data (padding data) on the border-out area 351 in the first recording layer 301 while scanning the border-out area 351 along the direction from its inner edge toward its outer edge. As a result, a data-recorded border-out region 736 is formed in the first recording layer 301 (see FIG. 30). Furthermore, the drive apparatus 20 records prescribed data (padding data) on the border-in area 362 in the second recording layer 302 while scanning the border-in area 362 along the direction from its outer edge toward its inner edge. As a result, a data-recorded border-in region 737 is formed in the second recording layer 302 (see FIG. 30). In this way, the padding-data-recorded regions 735-737 are formed during the closing of the bordered areas. The drive apparatus 20 rewrites data in an outer portion of the lead-in area 313.

At an end of the closing of the bordered areas, the drive apparatus 20 gets information about the ECC block address "Y" of outermost one among the used sectors (the data-recorded sectors) in the second recording layer 302, and places the ECC block address "Y" in the related RMD field, that is, the outermost data-recorded address field and records the ECC block address "Y" on the RMA 312 as a part of an RMD block. Consequently, a data-recorded portion 738 is formed in the RMA 312 (see FIG. 30). The outermost data-recorded address field value "Y" is equal to the ECC block address "G" of the outer edge of the data-recorded border-in region 737 in the disc conditions of FIG. 30.

Specifically, the drive apparatus 20 compares the outermost data-recorded address field value "Y" (the ECC block address "D") extracted from the read-out newest RMD block with the ECC block address "G" of the outer edge of the data-recorded border-in region 737 which corresponds to outermost one among the used sectors generated by the present data recording. According to the result of the comparison, the drive apparatus 20 decides that the ECC block address "G" corresponds to an outer side in comparison with the ECC block address "D". Therefore, the drive apparatus 20 newly uses the ECC block address "G" as the ECC block address "Y" of outermost one among the used sectors in the second recording layer 302. Thus, as shown in FIG. 34, the drive apparatus 20 places the ECC block address "G" in the outermost data-recorded address field (byte positions BP of "8" to "11") of the RMD block. On the other hand, when the ECC block address "D" corresponds to an outer side in comparison with the ECC block address "G", the drive apparatus 20 holds the ECC block address "D" in the outermost data-recorded address field of the RMD block.

The outermost data-recorded address field value "Y" in the RMD block is held until one of the following actions (1), (2), and (3) is carried out. (1) A new bordered area is added to the optical disc 30. (2) The bordered area is extended outwards with respect to the optical disc 30, and then the bordered area is closed. (3) The recorded data is erased from the optical disc 30.

In the case where the drive apparatus 20 decides that the ECC block address "Z" corresponds to a position inward of the position denoted by the outermost data-recorded address field value "Y", the drive apparatus 20 concludes an unused portion to be absent from the present bordered area in the second recording layer 302. Accordingly, the drive apparatus 20 does not record padding data in connection with the present bordered area in the second recording layer 302. On the other hand, the drive apparatus 20 records prescribed data (padding data) on the border-out area 351 in the first recording layer 301 to form a data-recorded border-out region 736. Furthermore, the drive apparatus 20 records prescribed data (padding data) on the border-in area 362 in the second recording layer 302 to form a data-recorded border-in region 737. In addition, the drive apparatus 20 rewrites data in an outer portion of the lead-in area 313.

As previously mentioned, padding data with the data area attribute is recorded over the portion of the second recording layer 302 which extends up to the position corresponding to the ECC block address "D". It is unnecessary to record padding data on the portion of the second recording layer 302 which extends inward of the position corresponding to the ECC block address "D". Accordingly, it is possible to shorten the time taken by the recording of padding data on the optical disc 30.

Sometimes, there occurs case where user data has been newly recorded on only a portion of the data area 314 in the first recording layer 301 and hence the data area 324 in the second recording layer 302 does not have been newly loaded with user data before the implementation of the bordered-area closing process. In this case, during the bordered-area closing process, the drive apparatus 20 records padding data with the data area attribute on the unused portion of the data area 314 in the first recording layer 301 from the outer edge of the user-data-recorded portion to the inner edge of the border-out area 351. With respect to the second recording layer 302, the drive apparatus 20 carries out the previously-mentioned steps of the bordered-area closing process while using the ECC block address of the boundary with the border-in area 362 as the innermost data-recorded address "E" in the user-data-recorded region.

As previously mentioned, at the time of the bordered-area closing process, the ECC block address of outermost one among the data-recorded sectors (the used sectors) in the border zone in the second recording layer 302 is stored in the outermost data-recorded address field of the RMD block and is recorded on the optical disc 30. The address value "Y" in the outermost data-recorded address field of the RMD block is held even when the optical disc 30 is reformatted. At the time of the next bordered-area closing process, the drive apparatus 20 reads out the outermost data-recorded address field value "Y" from the optical disc 30 to get the information about the position of the outer edge of a data-recorded disc area in the second recording layer 302. The drive apparatus 20 utilizes this positional information for the bordered-area closing process, thereby shortening the time taken by the bordered-area closing process.

The address of the outer edge of a data-recorded region in the second recording layer 302 at the time of the bordered-area closing process is substantially equal to that of the inner edge of an unused region therein. At the time of the bordered-area closing process, the address of the outer edge of a data-recorded region in the second recording layer 302 is in one-to-one correspondence with the address of the outer edge of a data-recorded region in the first recording layer 301. Accordingly, the outermost data-recorded address field of the RMD block may be loaded with the address of the outer edge of the data-recorded region in the first recording layer 301 instead of the address of the outer edge of the data-recorded region in the second recording layer 302.

It should be noted that the drive apparatus 20 may calculate the ECC block address "X" of a position a given interval inwardly distant from the position corresponding to the end ECC block address in the user-data-recorded region of the second recording layer 302. The given interval is expressed by a prescribed address value corresponding to, for example, an on-disc radial width of 0.5 mm. In this case, the drive apparatus 20 compares the outermost data-recorded address field value "Y" with the ECC block address "X" rather than the end ECC block address "Z" in the user-data-recorded region of the second recording layer 302. The border-area closing process responds to the result of the comparison as the disc finalization does in the first embodiment of this invention.

In the optical disc 30 which has been subjected to the bordered-area closing process once, the prescribed data occupies the lead-in area 313 and the lead-out area 323. Thus, in the case where the recording of user data on the optical disc 30 and the next bordered-area closing process are successively carried out thereafter, it is sufficient to rewrite only necessary portions of the first and second recording layers 301 and 302 except the lead-in area 313 and the lead-out area 323. Prescribed data may be re-recorded on at least one of the lead-in area 313 and the lead-out area 323. The outermost data-recorded address field value "Y" may be used as an indication of the position of a border-in area or a border-out area.

Figure 35:
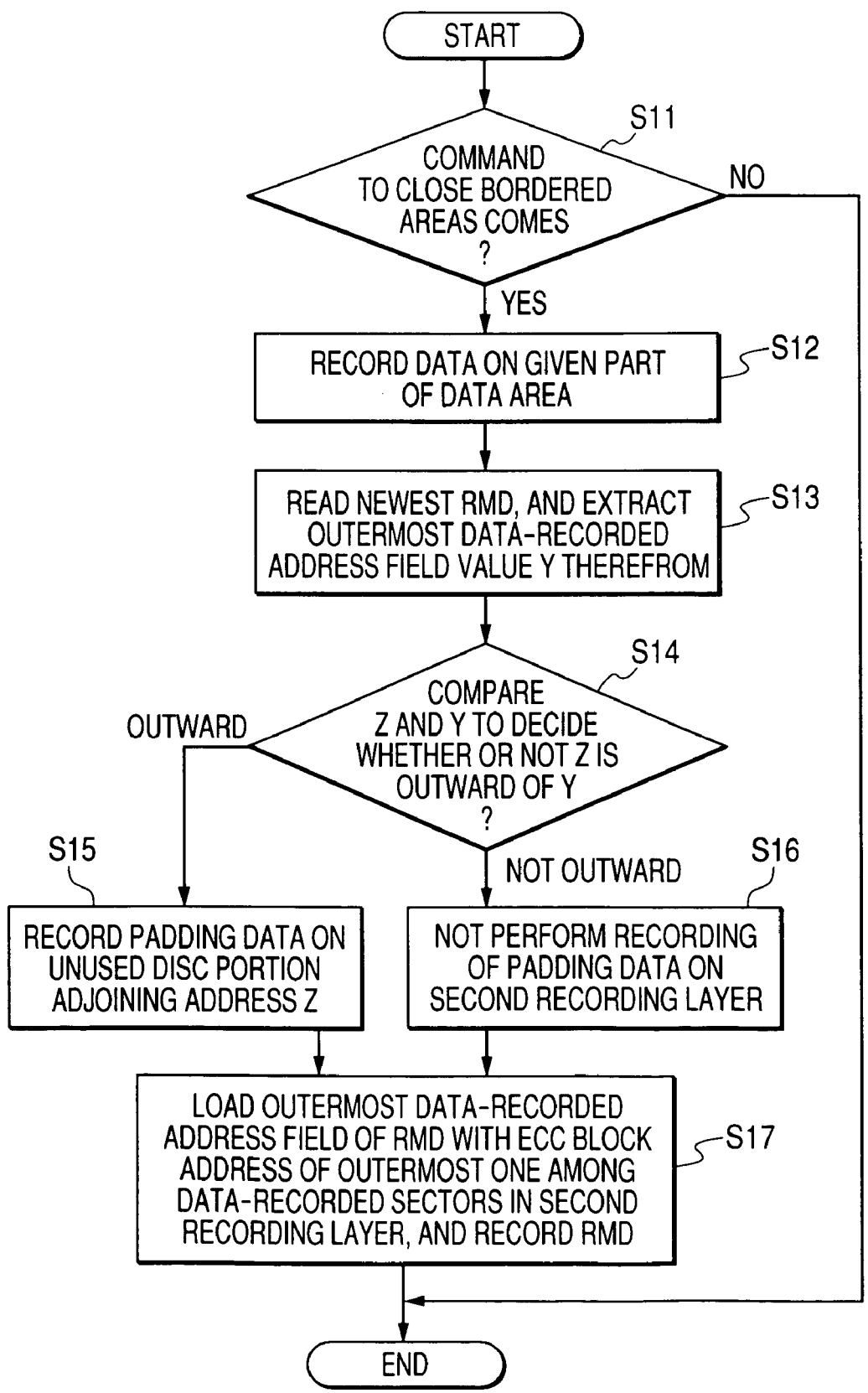
FIG. 35 is a flowchart of a segment of a control program for an optical-disc drive apparatus in the second embodiment of this invention.

FIG. 35 is a flowchart of a segment of the control program for the drive apparatus 20 (the system controller 21) which relates to the bordered-area closing process. The program segment in FIG. 35 is repetitively executed.

As shown in FIG. 35, a first step S11 of the program segment decides whether or not a command to close the bordered areas in the optical disc 30 comes from the host apparatus 10. When a command comes, the program advances from the step S11 to a step S12. Otherwise, the program exits from the step S11, and then the current execution cycle of the program segment ends.

The step S12 records a disc file system or prescribed data in a given part of the data area 314 in the first recording layer 301 which extends radially outward from its inner edge. For example, a file-system-recorded region 720 or a data-recorded region 734 is formed accordingly (see FIG. 25 or FIG. 30).

A step S13 following the step S12 reads out the newest RMD block from the optical disc 30, and extracts the outermost data-recorded address field value "Y" from the read-out newest RMD block.

A step S14 subsequent to the step S13 gets information about the end ECC block address "Z" in the user-data-recorded region of the second recording layer 302. Then, the step S14 compares the outermost data-recorded address field value "Y" with the ECC block address "Z" to decide which of the value "Y" and the address "Z" corresponds to an inner side with respect to the optical disc 30. This decision is to determine whether an unused portion is present in or absent from the region of the second recording layer 302 between the positions denoted by the value "Y" and the address "Z". When the ECC block address "Z" corresponds to an outer side in comparison with the outermost data-recorded address field value "Y", that is, when an unused portion is present in the region of the second recording layer 302 between the positions denoted by the value "Y" and the address "Z", the program advances from the step S14 to a step S15. Otherwise, the program advances from the step S14 to a step S16.

The step S15 records padding data on prescribed unused portions of the optical disc 30 which include a prescribed unused portion adjoining the position denoted by the ECC block address "Z". For example, padding-data-recorded regions 721-725 (see FIG. 25) or padding-data-recorded regions 728-732 (see FIG. 28) are generated accordingly. After the step S15, the program advances to a step S17.

The step S16 concludes an unused portion to be absent from the present bordered area in the second recording layer 302. Accordingly, the recording of padding data is not carried out in connection with the present bordered area in the second recording layer 302. The step S16 records prescribed data (padding data) on the border-out area in the first recording layer 301. Furthermore, the step S16 records prescribed data (padding data) on the border-in area in the second recording layer 302. In addition, the drive apparatus 20 rewrites data in an outer portion of the lead-in area 313. After the step S16, the program advances to the step S17.

The step S17 gets information about the ECC block address "Y" of outermost one among the used sectors (the data-recorded sectors) in the second recording layer 302. The step S17 places the ECC block address "Y" in the outermost data-recorded address field of an RMD block. The step S17 records the resultant RMD block on the RMA 312 of the optical disc 30. Thus, the ECC block address "Y" of outermost one among the used sectors in the second recording layer 302 is recorded on the optical disc 30 as a part of the RMD block which represents the outermost data-recorded address field value. After the step S17, the current execution cycle of the program segment ends.

Third Embodiment

A third embodiment of this invention is a combination of the first and second embodiments thereof. The third embodiment of this invention implements the disc finalization as the first embodiment thereof does. The third embodiment of this invention carries out the bordered-area closing process as the second embodiment thereof does.

In a first example of the operation of the third embodiment of this invention, the optical disc 30 is successively subjected to the multi-border recording and the quick formatting. Thereafter, user data is recorded on the optical disc 30, and is then finalized.

In a second example of the operation of the third embodiment of this invention, the optical disc 30 is successively subjected to the finalization and the quick formatting. Thereafter, user data is recorded on the optical disc 30, and is then subjected to the bordered-area closing process.

Fourth Embodiment

A fourth embodiment of this invention is similar to one of the first to third embodiments thereof except that the optical disc 30 includes a laminate of three or more recording layers.

Fifth Embodiment

A fifth embodiment of this invention is similar to one of the first to fourth embodiments thereof except for design changes described hereafter.

According to the fifth embodiment of this invention, the control program for the drive apparatus 20 is initially stored in a recording medium. The recording medium is connected with the drive apparatus 20 and is driven therein so that the control program is loaded from the recording medium into the program memory 24.

Alternatively, the control program may be downloaded to the program memory 24 via a transmission line or a communication line.

What is claimed is:

1. A method of recording information on a rewritable optical disc having a laminate of recording layers including first and second recording layers each with a data area and a recording management area, the method comprising the steps of:

calculating a first on-disc position related to an innermost position within a first data-recorded region in the data area of the second recording layer, the first data-recorded region being generated by latest data recording on the disc;

reproducing recording management information from one of the recording management areas of the first and second recording layers;

deriving a second on-disc position from the reproduced recording management information, the second on-disc position is in substantial coincidence with an outer-most position within a second data-recorded region in the second recording layer, the second data-recorded region being generated by data recording on the disc which is previous to the latest data recording;

comparing the first on-disc position and the second on-disc position to decide whether an unused portion is present in or absent from a region between the first on-disc position and the second on-disc position;

recording padding data on the unused portion to implement one of (1) finalizing the disc and (2) closing a bordered area in the disc when it is decided that the unused portion is present in the region between the first on-disc position and the second on-disc position;

updating the second on-disc position into substantial coincidence with an outermost position within the first data-recorded region; and updating the recording management information in one of the recording management areas of the first and second recording layers in accordance with the updating of the second on-disc position.

2. A method as recited in claim 1, further comprising the steps of:

simply reformatting the disc; and holding a portion of the recording management information in one of the recording management areas of the first and second recording layers which relates to the second on-disc position during the simply reformatting of the disc.

3. An apparatus for recording information on a rewritable optical disc having a laminate of recording layers including first and second recording layers each with a data area and a recording management area, the apparatus comprising:

first means for calculating a first on-disc position related to an innermost position within a first data-recorded region in the data area of the second recording layer, the first data-recorded region being generated by first latest data recording on the disc;

second means for reproducing recording management information from one of the recording management areas of the first and second recording layers;

third means for deriving a second on-disc position from the recording management information reproduced by the second means, the second on-disc position is in substantial coincidence with an outer-most position within a second data-recorded region in the second recording layer, the second data-recorded region being generated by second latest data recording on the disc;

fourth means for comparing the first on-disc position calculated by the first means and the second on-disc position derived by the third means to decide whether an unused portion is present in or absent from a region between the first on-disc position and the second on-disc position;

fifth means for recording padding data on the unused portion to implement one of (1) finalizing the disc and (2) closing a bordered area in the disc when the fourth means decides that the unused portion is present in the region between the first on-disc position and the second on-disc position;

sixth means for updating the second on-disc position into substantial coincidence with an outermost position within the first data-recorded region; and seventh means for updating the recording management information in one of the recording management areas of the first and second recording layers in accordance with the updating of the second on-disc position by the sixth means.

4. An apparatus as recited in claim 3, further comprising:
eighth means for simply reformatting the disc; and
ninth means for holding a portion of the recording management information in one of the recording management areas of the first and second recording layers which relates to the second on-disc position during the simply reformatting of the disc by the eighth means.

5. A computer system having a computer program for recording information on a rewritable optical disc having a laminate of recording layers including first and second recording layers each with a data area and a recording management area, the computer system operating in accordance with the computer program and thereby executing the steps of:

calculating a first on-disc position related to an innermost position within a first data-recorded region in the data area of the second recording layer, the first data-recorded region being generated by first latest data recording on the disc;

reproducing recording management information from one of the recording management areas of the first and second recording layers;

deriving a second on-disc position from the reproduced recording management information, the second on-disc position is in substantial coincidence with an outer-most position within a second data-recorded region in the second recording layer, the second data-recorded region being generated by second latest data recording on the disc;

comparing the first on-disc position and the second on-disc position to decide whether an unused portion is present in or absent from a region between the first on-disc position and the second on-disc position;

recording padding data on the unused portion to implement one of (1) finalizing the disc and (2) closing a bordered area in the disc when it is decided that the unused portion is present in the region between the first on-disc position and the second on-disc position;

updating the second on-disc position into substantial coincidence with an outermost position within the first data-recorded region; and updating the recording management information in one of the recording management areas of the first and second recording layers in accordance with the updating of the second on-disc position.

6. A computer system as recited in claim 5, further executing the steps of:

simply reformatting the disc; and holding a portion of the recording management information in one of the recording management areas of the first and second recording layers which relates to the second on-disc position during the simply reformatting of the disc.

7. A method of recording information on a rewritable optical disc having a recording management area and a laminate of recording layers including first and second recording layers, the method comprising the steps of:

recording data on the first and second recording layers to form data-recorded regions including a first data-recorded region extending in the second recording layer, and thereafter recording data on the first and second recording layers to form data-recorded regions including a second data-recorded region extending in the second recording layer;

deriving a first on-disc position related to an innermost position within the second data-recorded region;

reproducing information from the recording management area;

deriving a second on-disc position from the reproduced information, the second on-disc position is in substantial coincidence with an outermost position within the first data-recorded region;

comparing the first on-disc position and the second on-disc position to decide whether an unused portion is present in or absent from a region between the first on-disc position and the second on-disc position;

recording padding data on the unused portion when it is decided that the unused portion is present in the region between the first on-disc position and the second on-disc position;

updating the second on-disc position into substantial coincidence with an outermost position within the second data-recorded region; and updating the information in the recording management area to reflect the updated second on-disc position.

8. A method as recited in claim 7, further comprising the steps of:

simply reformatting the disc; and holding a portion of the information in the recording management area which relates to the second on-disc position during the simply reformatting of the disc.

9. An apparatus for recording information on a rewritable optical disc having a recording management area and a laminate of recording layers including first and second recording layers, the apparatus comprising:

first means for recording data on the first and second recording layers to form data-recorded regions including a first data-recorded region extending in the second recording layer, and thereafter recording data on the first and second recording layers to form data-recorded regions including a second data-recorded region extending in the second recording layer;

second means for deriving a first on-disc position related to an innermost position within the second data-recorded region;

third means for reproducing information from the recording management area;

fourth means for deriving a second on-disc position from the information reproduced by the third means, the second on-disc position is in substantial coincidence with an outermost position within the first data-recorded region;

fifth means for comparing the first on-disc position derived by the second means and the second on-disc position derived by the fourth means to decide whether an unused portion is present in or absent from a region between the first on-disc position and the second on-disc position;

sixth means for recording padding data on the unused portion when the fifth means decides that the unused portion is present in the region between the first on-disc position and the second on-disc position;

seventh means for updating the second on-disc position into substantial coincidence with an outermost position within the second data-recorded region; and eighth means for updating the information in the recording management area to reflect the second on-disc position updated by the seventh means.

10. An apparatus as recited in claim 9, further comprising:

ninth means for simply reformatting the disc; and tenth means for holding a portion of the information in the recording management area which relates to the second on-disc position during the simply reformatting of the disc by the ninth means.

11. An optical information recording method comprising the steps of enabling an optical pickup to apply a light beam to each of recording layers of a rewritable optical information recording medium having a plurality of recording layers, arbitrarily setting a middle area or a border zone in a data area of the plurality of the recording layers, recording user data on a region between the middle area or the border zone and an innermost position of the data area or another border zone in an inner side, recording recording management information in a recording management area of each of the recording layers, thereafter implementing a border close process or a finalize process for allowing playback by an exclusive playback device, characterized by further comprising:

a first step of, in the case where with respect to a rewritable optical information recording medium loaded with user data of previous time and then subjected to the finalize process or the border close process, quick format is implemented and user data of this time is recorded and thereafter the finalize process or the border close process is implemented, calculating a first position information representing an innermost position of a user data recorded region of this time which is recorded immediately before a command for the finalize process or the border close process in a data area of another recording layer among the plurality of the recording layers except a recording layer closest to the optical pickup;

a second step of obtaining second position information representing a position in substantial coincidence with an outermost position of a user data recorded region of up to previous time in the other recording layer which is contained in the recording management information reproduced from the recording management area;

a third step of judging whether or not an unrecorded portion is present between the innermost position of the user data recorded region of this time and the position in substantial coincidence with the outermost position of the user data recorded region of up to previous time in the other recording layer on the basis of the first position information and the second position information;

a fourth step of, when it is judged that the unrecorded portion is present in the other recording layer, recording padding data on the unrecorded portion and leaving a padding data recorded portion and a data recorded portion of up to previous time between the position in substantial coincidence with the outermost position of the user data recorded region of up to previous time and the innermost position of the data area in the other recording layer as they are; and a fifth step of recording position information representing the position in substantial coincidence with the outermost position of the user data recorded region of this time in the other recording layer on the recording management area as the second position information while making it contained in the recording management information.

12. An optical information recording apparatus comprising means for enabling an optical pickup to apply a light beam to each of recording layers of a rewritable optical information recording medium having a plurality of recording layers, means for arbitrarily setting a middle area or a border zone in a data area of the plurality of the recording layers, means for recording user data on a region between the middle area or the border zone and an innermost position of the data area or another border zone in an inner side, means for recording recording management information in a recording management area of each of the recording layers, and means for thereafter implementing a border close process or a finalize process for allowing playback by an exclusive playback device, characterized by further comprising:

means for, in the case where with respect to a rewritable optical information recording medium loaded with user data of previous time and then subjected to the finalize process or the border close process, quick format is implemented and user data of this time is recorded and thereafter the finalize process or the border close process is implemented, calculating a first position information representing an innermost position of a user data recorded region of this time which is recorded immediately before a command for the finalize process or the border close process in a data area of another recording layer among the plurality of the recording layers except a recording layer closest to the optical pickup;

means for obtaining second position information representing a position in substantial coincidence with an outermost position of a user data recorded region of up to previous time in the other recording layer which is contained in the recording management information reproduced from the recording management area;

means for judging whether or not an unrecorded portion is present between the innermost position of the user data recorded region of this time and the position in substantial coincidence with the outermost position of the user data recorded region of up to previous time in the other recording layer on the basis of the first position information and the second position information;

means for, when it is judged that the unrecorded portion is present in the other recording layer, recording padding data on the unrecorded portion and leaving a padding data recorded portion and a data recorded portion of up to previous time between the position in substantial coincidence with the outermost position of the user data recorded region of up to previous time and the innermost position of the data area in the other recording layer as they are; and means for recording position information representing the position in substantial coincidence with the outermost position of the user data recorded region of this time in the other recording layer on the recording management area as the second position information while making it contained in the recording management information.

* * * * *